(12) United States Patent
Gangam

(10) Patent No.: US 11,140,078 B1
(45) Date of Patent: Oct. 5, 2021

(54) MULTI-STAGE PREFIX MATCHING ENHANCEMENTS

(71) Applicant: Innovium, Inc., San Jose, CA (US)

(72) Inventor: Srinivas Gangam, San Jose, CA (US)

(73) Assignee: Innovium, Inc., San Jose, CA (US)

( * ) Notice: Subject to any disclaimer, the term of this patent is extended or adjusted under 35 U.S.C. 154(b) by 418 days.

(21) Appl. No.: 16/164,699

(22) Filed: Oct. 18, 2018

(51) Int. Cl.
*H04L 12/745* (2013.01)
*H04L 12/743* (2013.01)

(52) U.S. Cl.
CPC ........ *H04L 45/748* (2013.01); *H04L 45/7453* (2013.01); *H04L 45/7457* (2013.01)

(58) Field of Classification Search
CPC ............. H04L 45/748; H04L 45/7453; H04L 45/7457
See application file for complete search history.

(56) References Cited

U.S. PATENT DOCUMENTS

| | | | |
|---|---|---|---|
| 6,564,211 | B1 | 5/2003 | Andreev et al. |
| 6,928,430 | B1 | 8/2005 | Chien et al. |
| 7,313,666 | B1 | 12/2007 | Silva et al. |
| 7,936,764 | B1 | 5/2011 | Krishnan |
| 7,986,696 | B1 | 7/2011 | Miliavisky et al. |
| 9,596,181 | B1 | 3/2017 | Goel et al. |
| 10,230,639 | B1 | 3/2019 | Patil et al. |
| 2002/0131432 | A1 | 9/2002 | Bachmutsky et al. |
| 2004/0052251 | A1 | 3/2004 | Mehrotra et al. |
| 2004/0215609 | A1 | 10/2004 | Takatsu et al. |
| 2006/0253606 | A1 | 11/2006 | Okuno |
| 2013/0031077 | A1 | 1/2013 | Liu et al. |
| 2013/0246651 | A1* | 9/2013 | Keen .................. H04L 45/7453 709/238 |
| 2013/0297641 | A1 | 11/2013 | Shinjo et al. |
| 2014/0086249 | A1 | 3/2014 | Assarpour |

(Continued)

FOREIGN PATENT DOCUMENTS

WO     2011078812 A1     6/2011

OTHER PUBLICATIONS

United States Patent and Trademark Office, U.S. Appl. No. 15/290,821, Notice of Allowance dated Aug. 6, 2019.

(Continued)

*Primary Examiner* — Samina F Choudhry
(74) *Attorney, Agent, or Firm* — Wong & Rees LLP; Karl T. Rees

(57) ABSTRACT

Approaches, techniques, and mechanisms are disclosed for maintaining efficient representations of prefix tables for utilization by network switches and other devices. In an embodiment, the performance of a network device is greatly enhanced using a working representation of a prefix table that includes multiple stages of prefix entries. Higher-stage prefixes are stored in slotted pools. Mapping logic, such as a hash function, determines the slots in which a given higher-stage prefix may be stored. When trying to find a longest-matching higher-stage prefix for an input key, only the slots that map to that input key need be read. Higher-stage prefixes may further point to arrays of lower-stage prefixes. Hence, once a longest-matching higher-stage prefix is found for an input key, the longest prefix match in the table may be found simply by comparing the input key to lower-stage prefixes in the array that the longest-matching higher-stage prefix points to.

20 Claims, 12 Drawing Sheets

(56) References Cited

U.S. PATENT DOCUMENTS

2015/0098470 A1      4/2015  Sun
2017/0142013 A1      5/2017  Zhang
2018/0329967 A1*    11/2018  Lee .................... G06F 16/27
2019/0280975 A1*     9/2019  Sharif ................. H04L 45/748

OTHER PUBLICATIONS

Kostas Pagiamtzis et al., Titled "Content-Addressable Memory (CAM) Circuits and Architectures: A Tutorial and Survey", (Pagiamtzis hereinafter) was published in IEEE Journal of Solid-State Circuits, vol. 41, No. 3, Mar. 2006.
McAuley et al., presented in IEEE INFOCOM '93 The Conference on Computer Communications, Proceedings, Mar. 28-Apr. 1, 1993, Titled Fast Routing Table Lookup Using CAMs, (McAuley hereinafter) was published as DOI: 10.1109/INFCOM.1993.253403.
Satendra Maurya et al., Titled "Low Power Fast and Dense Longest Prefix Match Content Addressable Memory for IP Routers," (Maurya hereinafter) was published Aug. 19-21, 2009.
Somnath Paul et al., Titled "Reconfigurable Computing Using Content Addressable Memory for Improved Performance and Resource Usage", (Paul hereinafter) was published Jun. 8-13, 2008.
United States Patent and Trademark Office, U.S. Appl. No. 15/290,821, Non-Final Office Action dated Sep. 11, 2018.
United States Patent and Trademark Office, U.S. Appl. No. 15/671,151, Notice of Allowance dated Oct. 10, 2018.

* cited by examiner

MULTI-STAGE PREFIX MATCHING ENHANCEMENTS

CROSS-REFERENCE TO RELATED APPLICATIONS

This application is related to U.S. patent application Ser. No. 14/883,588, filed Oct. 14, 2015, entitled "Network Device Storage of Incremental Prefix Trees," by Agarwal et al., the entire contents of which are hereby incorporated by reference for all purposes as if fully set forth herein. This application is further related to U.S. patent application Ser. No. 15/290,821, filed Oct. 11, 2016, entitled "Network Device Storage of Incremental Prefix Trees," by Agarwal et al., the entire contents of which are hereby incorporated by reference for all purposes as if fully set forth herein. This application is further related to U.S. patent application Ser. No. 15/671,151, filed Aug. 8, 2017, entitled "Enhanced Prefix Matching," by Patil et al., the entire contents of which are hereby incorporated by reference for all purposes as if fully set forth herein.

TECHNICAL FIELD

Embodiments relate generally to network devices, and, more specifically, to techniques for prefix-based mapping techniques for forwarding decisions and other applications.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

A computer network is a set of computing components interconnected by communication links. Each computing component may be a separate computing device, such as, without limitation, a hub, switch, bridge, router, server, gateway, or personal computer, or a component thereof. Each computing component, or "network device," is considered to be a node within the network. A communication link is a mechanism of connecting at least two nodes such that each node may transmit data to and receive data from the other node. Such data may be transmitted in the form of signals over transmission media such as, without limitation, electrical cables, optical cables, or wireless media.

The structure and transmission of data between nodes is governed by a number of different protocols. There may be multiple layers of protocols, typically beginning with a lowest layer, such as a "physical" layer that governs the transmission and reception of raw bit streams as signals over a transmission medium. Each layer defines a data unit (the protocol data unit, or "PDU"), with multiple data units at one layer typically combining to form a single data unit in another. Additional examples of layers may include, for instance, a data link layer in which bits defined by a physical layer are combined to form a frame or cell, a network layer in which frames or cells defined by the data link layer are combined to form a packet, and a transport layer in which packets defined by the network layer are combined to form a TCP segment or UDP datagram. The Open Systems Interconnection model of communications describes these and other layers of communications. However, other models defining other ways of layering information may also be used. The Internet protocol suite, or "TCP/IP stack," is one example of a common group of protocols that may be used together over multiple layers to communicate information. However, techniques described herein may have application to other protocols outside of the TCP/IP stack.

A given node in a network may not necessarily have a link to each other node in the network, particularly in more complex networks. For example, in wired networks, each node may only have a limited number of physical ports into which cables may be plugged in to create links. Certain "terminal" nodes—often servers or end-user devices—may only have one or a handful of ports. Other nodes, such as switches, hubs, or routers, may have a great deal more ports, and typically are used to relay information between the terminal nodes. The arrangement of nodes and links in a network is said to be the topology of the network, and is typically visualized as a network graph or tree.

A given node in the network may communicate with another node in the network by sending data units along one or more different "paths" through the network that lead to the other node, each path including any number of intermediate nodes. The transmission of data across a computing network typically involves sending units of data, such as packets, cells, and/or frames, along paths through intermediary networking devices, such as switches or routers, that direct or redirect each data unit towards a corresponding destination.

While a data unit is passing through an intermediary networking device—a period of time that is conceptualized as a "visit" or "hop"—the device may perform any of a variety of actions, or processing steps, with the data unit. The exact set of actions taken will depend on a variety of characteristics of the data unit, such as metadata found in the header of the data unit, and in many cases the context or state of the network device. For example, address information specified by or otherwise associated with the data unit, such as a source address, destination address, or path information, is typically used to determine how to handle a data unit (i.e. what actions to take with respect to the data unit). For instance, an Internet Protocol ("IP") data packet may include a destination IP address field within the header of the IP data packet, based upon which a network device may determine one or more other networking devices, among a number of possible other networking devices, to forward the IP data packet to.

The information used by such networking devices to determine how to handle data units based on address information is generally referred to as forwarding information. The information is collectively referred to herein as a "forwarding table" or "policy table." A forwarding table may associate an address with policy information that dictates the action(s) that the device is to perform with respect to any data unit that is associated with the address. A network device may be configured to consult different types of forwarding tables for different purposes. For instance, a device may include one table describing policies to apply based on source address information at one network layer, another table describing policies to apply based on destination address information at another network layer, and yet other tables that serve yet other purposes. Note that the term "forwarding table" is a term of convenience, and does not require that the forwarding information actually be stored as a table. That is, though the forwarding information is perhaps easiest to conceptualize in table form, a forwarding table may actually be represented in a variety of forms, such as explained in later sections.

Rather than including a separate record, or entry, for each possible address, a table may be configured such that some entries of the table, or even all entries of the table, specify policy information for different groups of addresses. For example, an entry in an IP-based forwarding table may specify a group of IP addresses and a "next hop" device identifier, indicating that any data unit specifying a destination address that is a part of the specified group of IP addresses is to be forwarded to the specified next hop device. Each group may be referred to as a "subnet."

One common manner of specifying a group of addresses is by a common prefix that each of the addresses shares. Generally, a prefix is a first portion of a data item, such as of a network address. A prefix may be of any length, and thus any given address may have, or "match," multiple prefixes. For example, the prefixes 192, 192.168, and 192.168.1 would all be valid prefixes for the address 192.168.1.1. A table that maps prefixes to other information, such as forwarding instructions, is referred to herein as a prefix table. A forwarding table may thus be implemented as a prefix table.

Many types of network devices process a significant number of data units on a nearly continuous basis. Thus, the speed at which networking devices are able to process received data units can be of great importance. For these reasons and others, forwarding information and other similar data may be stored in a networking device using specialized high-speed memory components, such as content addressable memory (CAM). However, the use of such high-speed memory in networking devices is relatively expensive, both in terms of cost and power consumption. Thus, more efficient techniques for storing and searching forwarding information are desirable, particularly as the number of forwarding entries stored by a networking device grows large.

BRIEF DESCRIPTION OF THE DRAWINGS

The present inventive subject matter is illustrated by way of example, and not by way of limitation, in the figures of the accompanying drawings and in which like reference numerals refer to similar elements and in which.

DETAILED DESCRIPTION

Figure 1:
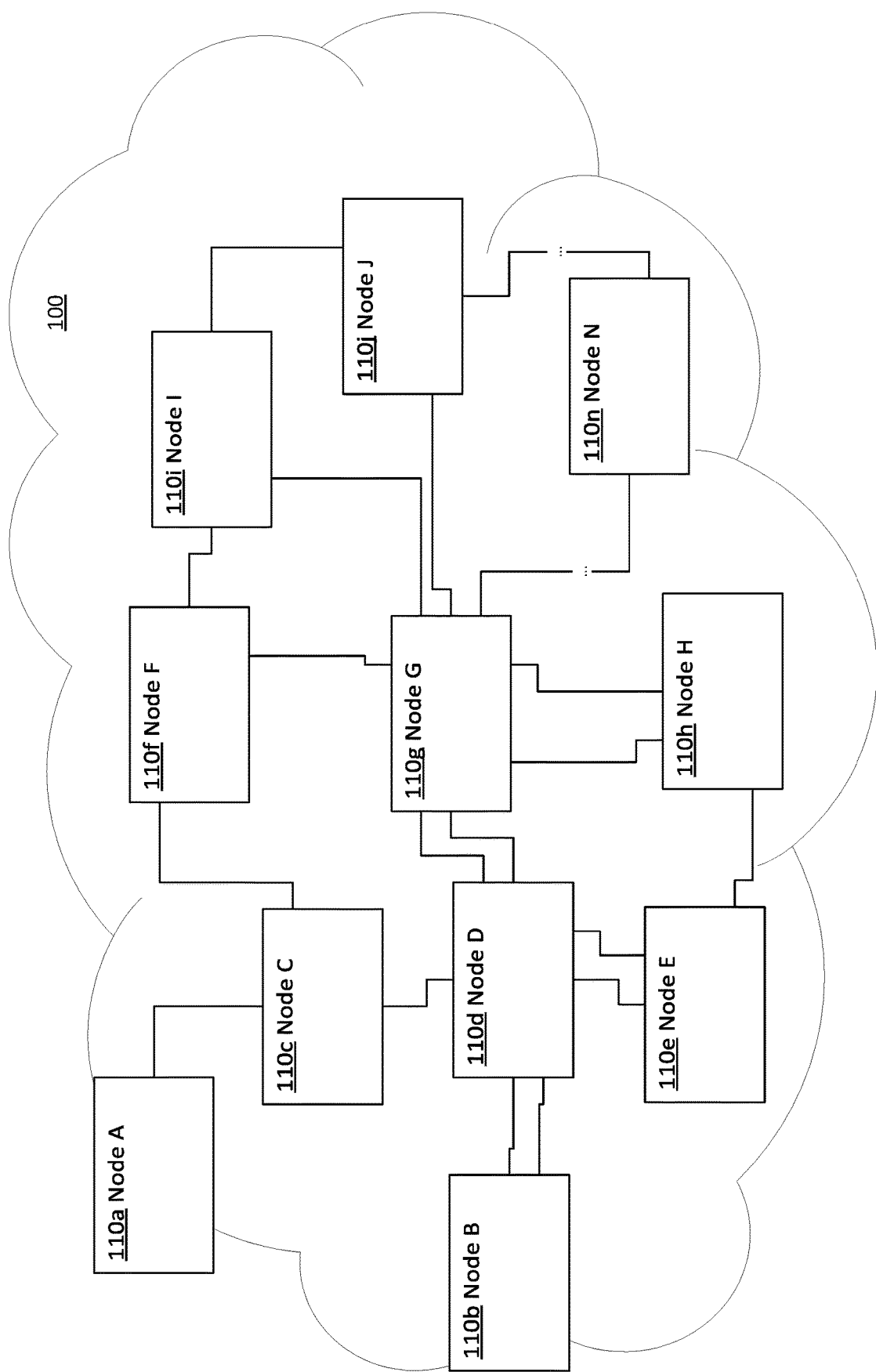
FIG. 1 is an illustrative view of various aspects of an example networking system in which the techniques described herein may be practiced.

In the following description, for the purposes of explanation, numerous specific details are set forth in order to provide a thorough understanding of the present inventive subject matter. It will be apparent, however, that the present inventive subject matter may be practiced without these specific details. In other instances, well-known structures and devices are shown in block diagram form in order to avoid unnecessarily obscuring the present inventive subject matter.

Embodiments are described herein according to the following outline:
1.0. General Overview
2.0. Structural Overview
2.1. Packets and Other Data Units
2.2. Network Paths
2.3. Network Device
2.4. Ports
2.5. Forwarding Logic
2.6. Prefix Table
2.7. Multi-Stage Implementation of Prefix Table
2.8. Prefix Table Management Logic
2.9. Miscellaneous
3.0. Functional Overview
3.1. Using the Working Representation of the Prefix Table
3.2. Handling a Data Unit Using a Multi-Stage Prefix Table
3.3. Adding a New Prefix to a Higher-Stage Pool
3.4. Falling Back to an Alternative Pool
3.5. Moving an Existing Prefix to Make Room for a New Prefix
3.6. Dividing a Shorter Prefix into Multiple Longer Prefixes
3.7. Utilizing an Overflow TCAM
4.0. Example Embodiments
5.0. Implementation Mechanism—Hardware Overview
6.0. Extensions and Alternatives

1.0. General Overview

Approaches, techniques, and mechanisms are disclosed for maintaining efficient representations of prefix tables for utilization during the operation of a network device and/or other types of devices. In an embodiment, the performance of a network device is greatly enhanced using a working representation of a prefix table that includes multiple stages of prefix entries. Higher-stage prefixes are stored in slotted pools. Mapping logic, such as a hash function, determines the slots in which a given higher-stage prefix may be stored. When trying to find a longest-matching higher-stage prefix for an input key, only the slots that map to that input key need be read. A slot may store one or more higher-stage prefixes. Higher-stage prefixes may further point to arrays of lower-stage prefixes. Hence, once a longest-matching higher-stage prefix is found for an input key, the longest prefix match in the table may be found simply by comparing the input key to lower-stage prefixes in the array that the longest-matching higher-stage prefix points to.

In an embodiment, each prefix has one or more associated actions to be performed with respect to data units or other constructs for which the prefix is a longest matching prefix. For example, actions for a network data unit may be indicated by policy data that specifies port(s) and/or queue(s) to which the data unit should be sent, traffic management or shaping policies, and/or other actions.

In an embodiment, the foregoing techniques permit realization of performance similar to that of multi-stage approaches in which a CAM is utilized for the higher-stage, without actually having to use a CAM to store all of the higher-stage prefixes. Rather, the higher-stage prefix pools may be stored in random access memories ("RAM") or other less-costly memories. Since, in an embodiment, only one slot in each pool—the slot indicated by the mapping function for that pool—can possibly store the longest-matching higher-stage prefix for any given input key, the longest-matching higher-stage prefix may be located without reading any other slots in the higher-stage pools. Thus, the described higher-stage logic may be completed much more quickly than more conventional RAM-based logic that might need to read up to all of the higher-stage prefixes, depending on the matching operation. In an embodiment, each pool may be a separate bank of RAM, allowing for further optimization of the reading of the higher-stage prefixes by reading the mapped slots in each of the pools concurrently.

In an embodiment, to more efficiently store the prefixes, different mapping logic may be utilized for different pools. Thus, prefixes or input keys may map to different slots in different pools. For instance, each pool may be associated with a different prefix length, and the mapping logic may hash an input key of that specific length.

In an embodiment, when determining where to store a new higher-stage prefix, prefix table management logic determines an initial pool in which to try to store the new prefix. If the slot mapped to the new prefix in the initial pool is full, fallback logic may be utilized to store the new prefix in a different pool, or to move an existing prefix from the occupied slot. Optionally, an overflow TCAM may be utilized to store higher-stage prefixes that cannot be stored in the higher-stage pools, even after taking fallback measures.

In other aspects, the inventive subject matter encompasses computer apparatuses and/or computer-readable media configured to carry out the foregoing techniques.

2.0. Structural Overview

FIG. 1 is an illustrative view of various aspects of an example networking system 100, also referred to as a network, in which the techniques described herein may be practiced, according to an embodiment. Networking system 100 comprises a plurality of interconnected nodes 110a-110n (collectively nodes 110), each implemented by a different computing device. For example, a node 110 may be a single networking computing device, such as a router or switch, in which some or all of the processing components described herein are implemented in application-specific integrated circuits (ASICs), field programmable gate arrays (FPGAs), or other integrated circuit(s). As another example, a node 110 may include one or more memories storing instructions for implementing various components described herein, one or more hardware processors configured to execute the instructions stored in the one or more memories, and various data repositories in the one or more memories for storing data structures utilized and manipulated by the various components.

Each node 110 is connected to one or more other nodes 110 in network 100 by one or more communication links, depicted as lines between nodes 110. The communication links may be any suitable wired cabling or wireless links. Note that system 100 illustrates only one of many possible arrangements of nodes within a network. Other networks may include fewer or additional nodes 110 having any number of links between them.

2.1. Packets and Other Data Units

While each node 110 may or may not have a variety of other functions, in an embodiment, each node 110 is configured to send, receive, and/or relay data to one or more other nodes 110 via these links. In general, data is communicated as series of discrete units or structures of data represented by signals transmitted over the communication links.

Different nodes 110 within a network 100 may send, receive, and/or relay data units at different communication levels, or layers. For instance, a first node 110 may send a unit of data at the network layer (e.g. a TCP segment) to a second node 110 over a path that includes an intermediate node 110. This unit of data will be broken into smaller units of data at various sublevels before it is transmitted from the first node 110. These smaller data units may be referred to as "subunits" or "portions" of the larger data unit.

For example, a TCP segment may be broken into packets, then cells, and eventually sent out as a collection of signal-encoded bits to the intermediate device. Depending on the network type and/or the device type of the intermediate node 110, the intermediate node 110 may rebuild the entire original data unit before routing the information to the second node 110, or the intermediate node 110 may simply rebuild certain subunits of data (e.g. frames and/or cells) and route those subunits to the second node 110 without ever composing the entire original data unit.

When a node 110 receives a unit of data, it typically examines addressing information within the unit of data (and/or other information within the unit of data) to determine how to process the unit. The addressing information may be, for instance, an Internet Protocol (IP) address, MPLS label, or any other suitable information. If the addressing information indicates that the receiving node 110 is not the destination for the data unit, the receiving node 110 may look up the destination node 110 within receiving node's routing information and route the data unit to another node 110 connected to the receiving node 110 based on forwarding instructions associated with the destination node 110 (or an address group to which the destination node belongs). The forwarding instructions may indicate, for instance, an outgoing port over which to send the unit of data, a label to attach the unit of data, etc. In cases where multiple paths to the destination node 110 are possible, the forwarding instructions may include information indicating a suitable approach for selecting one of those paths, or a path deemed to be the best path may already be defined.

Addressing information, flags, labels, and other metadata used for determining how to handle a data unit are typically embedded within a portion of the data unit known as the header. The header is typically at the beginning of the data unit, and is followed by the payload of the data unit, which is the information actually being sent in the data unit. A header is typically comprised of fields of different types, such as a destination address field, source address field, destination port field, source port field, and so forth. In some protocols, the number and the arrangement of fields may be fixed. Other protocols allow for arbitrary numbers of fields, with some or all of the fields being preceded by type information that explains to a node the meaning of the field.

A traffic flow is a sequence of data units, such as packets, from a source computer to a destination. In an embodiment, the source of the traffic flow may mark each data unit in the sequence as a member of the flow using a label, tag, or other suitable identifier within the data unit. In another embodiment, the flow is identified by deriving an identifier from other fields in the data unit (e.g. a "five-tuple" combination of a source address, source port, destination address, destination port, and protocol). A flow is often intended to be sent in sequence, and network devices are therefore typically configured to send all data units within a given flow along a same path to ensure that the flow is received in sequence.

For convenience, many of the techniques described in this disclosure are described with respect to routing data units that are IP packets in an L3 (level 3) network, or routing the constituent cells and frames thereof in an L2 (level 2) network, in which contexts the described techniques have particular advantages. It will be recognized, however, that these techniques may also be applied to realize advantages in routing other types of data units conforming to other protocols and/or at other communication layers within a network. Thus, unless otherwise stated or apparent, the techniques described herein should also be understood to apply to contexts in which the "data units" are of any other type of data structure communicated across a network, such as segments or datagrams. That is, in these contexts, other types of data structures may be used in place of packets, cells, frames, and so forth.

2.2. Network Paths

Any node in the depicted network 100 may communicate with any other node in the network 100 by sending data units through a series of nodes 110 and links, referred to as a path. For example, Node B (110b) may send data units to Node H (110h) via a path from Node B to Node D to Node E to Node H. There may be a large number of valid paths between two nodes. For example, another path from Node B to Node H is from Node B to Node D to Node G to Node H.

In an embodiment, a node 110 does not actually need to specify a full path for a data unit that it sends. Rather, the node 110 may simply be configured to calculate the best path for the data unit out of the device (e.g. which egress port it should send the data unit out on). When a node 110 receives a data unit that is not addressed directly to the node 110, based on header information associated with a data unit, such as path and/or destination information, the node 110 relays the data unit along to either the destination node 110, or a "next hop" node 110 that the node 110 calculates is in a better position to relay the data unit to the destination node 110. In this manner, the actual path of a data unit is product of each node 110 along the path making routing decisions about how best to move the data unit along to the destination node 110 identified by the data unit.

2.3. Network Device

Figure 2:
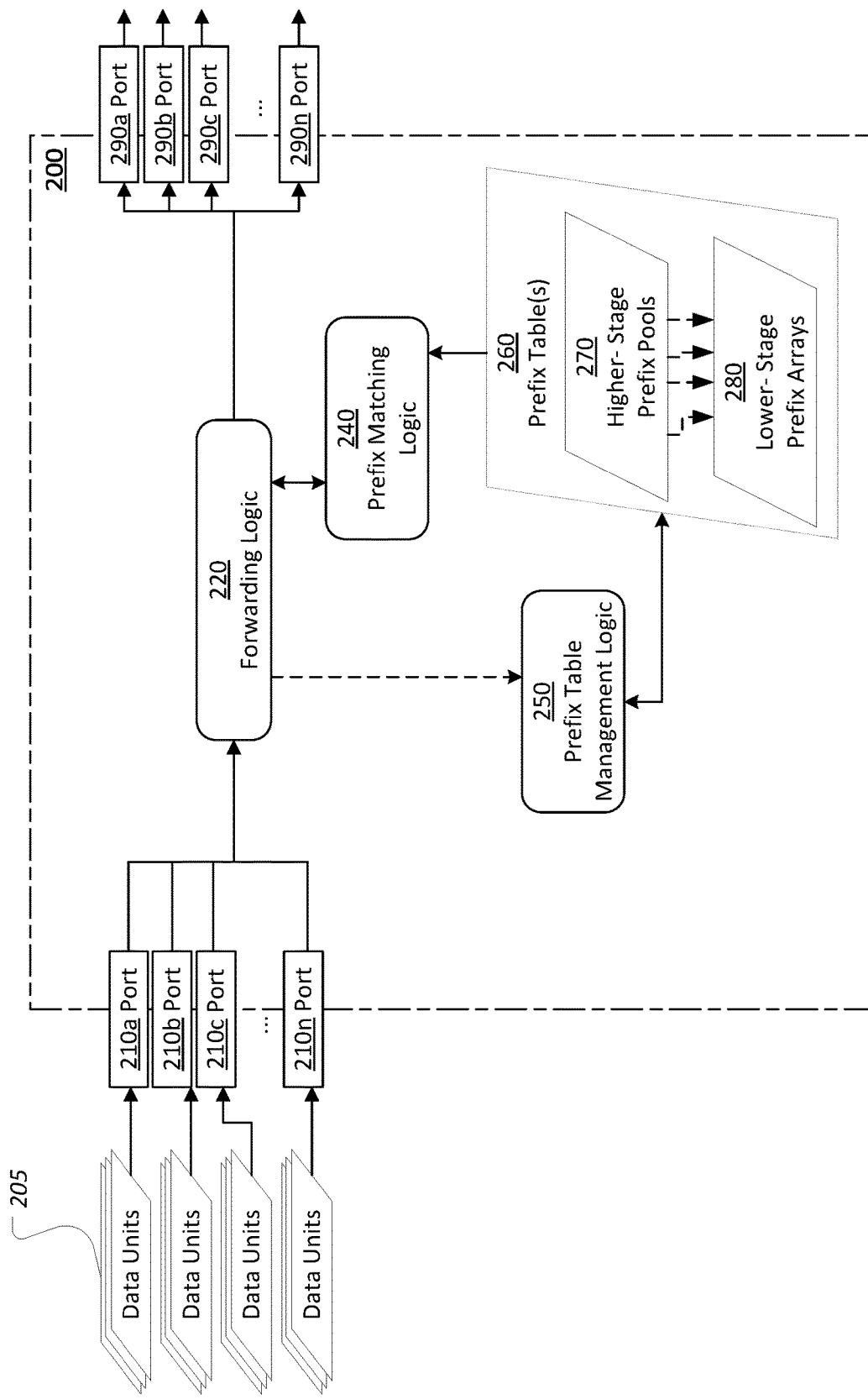
FIG. 2 is an illustrative view of various aspects of an example network device in which techniques described herein may be practiced.

FIG. 2 is an illustrative view of various aspects of an example network device 200 in which techniques described herein may be practiced, according to an embodiment. Network device 200 is a computing device comprising any combination of hardware and software configured to implement the various logical components described herein, including components 210-290. For example, the apparatus may be a single networking computing device, such as a router or switch, in which some or all of the components 210-290 described herein are implemented using application-specific integrated circuits (ASICs) or field programmable gate arrays (FPGAs). As another example, an implementing apparatus may include one or more memories storing instructions for implementing various components described herein, one or more hardware processors configured to execute the instructions stored in the one or more memories, and various data repositories in the one or more memories for storing data structures utilized and manipulated by various components 210-290.

Device 200 is generally configured to receive and forward data units 205 to other devices in a network, such as network 100, by means of a series of operations performed at various components within the device 200. Note that, in an embodiment, some or all of the nodes 110 in system 100 may each be or include a separate network device 200. In an embodiment, a node 110 may include more than one device 200. In an embodiment, device 200 may itself be one of a number of components within a node 110. For instance, network device 200 may be an integrated circuit, or "chip," dedicated to performing switching and/or routing functions within a network switch or router. The network switch or router may further comprise one or more central processor units, storage units, memories, physical interfaces, LED displays, or other components external to the chip, some or all of which may communicate with the chip.

Example components of a device 200 are now described in further detail.

2.4. Ports

Network device 200 includes ports 210/290. Ports 210, including ports 210a-n, are inbound ("ingress") ports by which data units referred to herein as data units 205 are received over a network, such as network 110. Ports 290, including ports 290a-n, are outbound ("egress") ports by which at least some of the data units 205 are sent out to other destinations within the network, after having been processed by the network device 200.

Data units 205 may be of any suitable structure, such as packets, cells, frames, etc. In an embodiment, data units 205 are packets. However, the individual atomic data units upon which the depicted components may operate may be actually be subunits of the data units 205, such as cells or frames. For example, data units 205 may be received, acted upon, and transmitted at a cell or frame level. These cells or frames are logically linked together as the data units 205 (e.g. packets) to which they respectively belong for purposes of determining how to handle the cells or frames. However, the cells or frames may not actually be assembled into data units 205 within device 200, particularly if the cells or frames are being forwarded to another destination through device 200.

Ports 210/290 are depicted as separate ports for illustrative purposes, but may actually correspond to the same physical hardware ports (e.g. network jacks or interfaces) on the network device 210. That is, a network device 200 may both receive data units 205 and send data units 205 over a single physical port, and the single physical port may thus function as both an ingress port 210 and egress port 290. Nonetheless, for various functional purposes, certain logic of the network device 200 may view a single physical port as a separate ingress port 210 and egress port 290. Moreover, for various functional purposes, certain logic of the network device 200 may subdivide a single physical ingress port or egress port into multiple ingress ports 210 or egress ports 290, or aggregate multiple physical ingress ports or egress ports into a single ingress port 210 or egress port 290. Hence, in various embodiments, ports 210 and 290 should be understood as distinct logical constructs that are mapped to physical ports rather than simply as distinct physical constructs.

2.5. Forwarding Logic

A device 200 comprises forwarding logic 220 by which the device 200 is configured to determine how to handle each data unit 205 the device 200 receives. Forwarding logic 220 may process data units 205 using a number of different subcomponents, such as one or more traffic managers and/or packet processors. These subcomponents may further be arranged to process data units 205 over multiple stages. At each stage, the data unit 205 is placed in a buffer, which is said to belong to a queue. A device 200 may have many queues, and each stage of processing may utilize one or more of the queues. At any given processing stage, one or more packet processing components read data units from associated queues and determine how to handle the data units. The collective actions of these processing components over these multiple stages is said to implement the forwarding logic 220 of the device 200.

A non-limiting example flow of a data unit 205 through various subcomponents of example forwarding logic 220 is as follows. After being received via a port 210, a data unit 205 may be buffered by an arbiter until it can be processed by an ingress packet processor, and then delivered to an interconnect. From the interconnect, the data unit 205 may be forwarded to a traffic manager. The traffic manager may store the data unit 205 in a buffer and assign the data unit 205 to a queue. The traffic manager manages the flow of the data unit 205 through the queue until the data unit 205 is released to an egress packet processor. Depending on the processing, the traffic manager may then assign the data unit 205 to another queue so that it may be processed by yet another egress processor, or the egress packet processor may send the data unit 205 to an egress arbiter from which the data unit 205 is finally forwarded out another port 290. Of course, depending on the embodiment, the forwarding logic 220 may omit some of these subcomponents and/or include other subcomponents in varying arrangements.

The forwarding logic 220 may be hard-coded and/or configurable, depending on the embodiment. For example, the forwarding logic 220 may, in some instances, be at least partially hard-coded into one or more packet processors or other hardware within the device 200. As another example, the forwarding logic, or elements thereof, may also be configurable, in that the logic changes over time in response to analyses of state information collected from, or instructions received from, the various components of the device 200 and/or other nodes in the network in which the device 200 is located.

In an embodiment, a device 200 will typically store in its memories one or more forwarding tables (or equivalent structures) that map certain data unit attributes or characteristics to policies or actions to be taken with respect to data units 205 having those attributes or characteristics, such as sending a data unit 205 to a selected path, or processing the data unit 205 using a specified internal component. For instance, such attributes or characteristics may include a Quality-of-Service level specified by the data unit 205 or associated with another characteristic of the data unit 205, a flow control group, an ingress port 210 through which the data unit 205 was received, a tag or label in a packet's header, a source address, a destination address, a packet type, or any other suitable distinguishing property.

In an embodiment, forwarding logic 220 may include a traffic manager or other component configured to read such a table, determine one or more ports to send a data unit 205 to based on policy data in the table, and send the data unit 205 to a queue and/or packet processor that is coupled to the one or more ports 290. Forwarding logic 220 may also include components configured to take other types of actions based on policy data in the table, such as manipulating a data unit 205, implementing flow control or traffic shaping policies, dropping a data unit 205, and so forth.

In an embodiment, forwarding logic 220 may read port state data. Port state data may include, for instance, flow control state information describing various traffic flows and associated traffic flow control rules or policies, link status information indicating links that are up or down, and/or port utilization information indicating how ports are being utilized (e.g. utilization percentages, utilization states, etc.). Forwarding logic 220 may be configured to implement the associated rules or policies associated with the flow(s) to which a given data unit 205 belongs.

In an embodiment, different queues may exist for different destinations. For example, each port 210 and/or port 290 may have its own set of queues. The queue to which an incoming data unit 205 is assigned may therefore be selected based on the port 210 through which it was received, while the queue to which an outgoing data unit 205 is assigned may be selected based on forwarding information indicating which port 290 the data unit 205 should depart from. A different packet processor may be associated with each different set of one or more queues. Hence, the current processing context of the data unit 205 may be used to select which queue a data unit 205 should be assigned to.

In an embodiment, there may also or instead be different queues for different flows or sets of flows. That is, each identifiable traffic flow or group of traffic flows is assigned its own set of queues to which its data units 205 are respectively assigned. In an embodiment, different queues may correspond to different classes of traffic or quality-of-service (QoS) levels. Different queues may also or instead exist for any other suitable distinguishing property of the data units 205, such as source address, destination address, data unit type, and so forth.

For instance, a data unit may be forwarded to another queue associated with another processing stage implemented by another set of processing components, sent out of the device 200 over an outbound port 290, discarded, delayed for flow control reasons, and so forth.

In the course of processing a data unit 205, a device 200 may replicate a data unit 205 one or more times. For example, a data unit 205 may be replicated for purposes such as multicasting, mirroring, debugging, and so forth. Thus, a single data unit 205 may be replicated to multiple queues. Hence, though certain techniques described herein may refer to the original data unit 205 that was received by the device 200, it will be understood that those techniques will equally apply to copies of the data unit 205 that have been generated for various purposes.

As data units 205 are routed through different nodes in a network, the nodes may, on occasion, discard, fail to send, or fail to receive data units, thus resulting in the data units failing to reach their intended destination. The act of discarding a data unit 205, or failing to deliver a data unit, is typically referred to as "dropping" the data unit 205. Instances of dropping a data unit 205, referred to herein as "drops" or "packet loss," may occur for a variety of reasons, such as resource limitations, errors, or deliberate policies.

2.6. Prefix Table

As mentioned, according to an embodiment, forwarding logic 220 reads certain instructions for handling network traffic from one or more forwarding tables. These forwarding tables may, in an embodiment, take the form of one or more prefix tables 260. Generally, a prefix table 260 describes groups of one or more addresses, such as subnets of IPv4 or IPv6 addresses. Each address is an address of a network device on a network, though a network device may have more than one address. Each group is associated with a potentially different set of one or more actions to execute with respect to data units 205 that resolve to (e.g. are directed to) an address within the group. Any suitable set of one or more actions may be associated with a group of addresses, including without limitation, forwarding a message to a specified "next hop," duplicating the message, changing the destination of the message, dropping the message, performing debugging or statistical operations, applying a quality of service policy or flow control policy, and so forth.

In some embodiments, a prefix table 260 may be a basic forwarding table that simply specifies a next hop for each group. In other embodiments, for example, a table 260 may describe one or more complex policies for each group. The action or actions associated with a group may be described by policy data associated with the group. A prefix table 260 may therefore also be known as a "policy table."

Moreover, there may be different types of prefix tables 260 for different purposes. For instance, one table 260 may be a basic forwarding table that is compared to the destination address of each data unit 205, while another table 260 may specify policies to apply to data units 205 upon ingress, based on their destination (or source) group, and so forth.

Address Prefixes

In an embodiment, groups of addresses are described using an address prefix. This prefix is, in essence, a beginning address portion that is common to each address in the group. The beginning address portion may be, for instance, a first number of bits, bytes, or other element. As used herein, a "prefix entry" generally refers to a data entry (i.e. in a forwarding table) which maps a particular prefix to particular policy data. The particular policy data indicates one or more actions to be performed with respect to data units 205 or other data structures associated with an input key (e.g. address) that matches the particular prefix. Thus, when determining how to handle a certain data unit 205, forwarding logic 220 may determine a group of addresses that a data unit 205 is associated with (e.g. a destination subnet, source subnet, etc.) using a prefix, and perform the one or more actions associated with that group, as described in the policy data.

For example, in the case of IP prefixes, a "slash notation", such as Classless Inter-Domain Routing (CIDR) notation, may be used to express a portion of an IP address that constitutes a prefix portion of the IP address. One example IP prefix may be expressed as "10.172.0.0/16", for instance, where the "/16" syntax indicates that the first 16 bits of the IP address 10.172.0.0 (corresponding to the "10.172" portion) are used to perform matches. The remaining 16 bits of the IP address 10.172.0.0 (the "0.0" portion) is treated as an arbitrary placeholder that is not used for matching. The prefix "10.172.0.0/16" thus matches the IP address "10.172.23.1" because the first 16 bits of both the prefix and IP address, when represented in bit form, are the same, but the same prefix does not match the IP address "10.170.3.28". In other words, a prefix matches an address if the address begins with the prefix.

Longest Matching Prefix

Multiple prefix entries may match the same input key (e.g. the same network address). For example, a particular set of IP prefix entries stored by a networking device may include a first prefix entry specifying the prefix "178.0.0.0/8" and a second prefix entry specifying the prefix "178.132.2.0/24." The IP address "178.132.2.11" would match both of these prefixes. In instances where multiple prefix entries match a particular network address, forwarding logic 220 is generally configured to perform only the action(s) associated with the prefix entry specifying the longest prefix (i.e. the more specific prefix) that matches the particular network address. The longest prefix that matches an input key, in a group of prefixes, is referred to as the longest-matching prefix in the group, or "longest prefix match." For instance, in the example given above, 178.132.2.0/24 is the longest prefix match for 178.132.2.11.

Forwarding logic 220 comprises or is coupled to prefix matching logic 240 configured to utilize a longest prefix matching ("LPM") algorithm to locate the longest prefix match for an input key in a prefix table 260. The input key, as mentioned, will typically be derived from a particular data unit 205 that the forwarding logic 220 is currently determining how to handle. The forwarding logic 220 is then configured to take appropriate actions with respect to this data unit, as indicated by policy data associated with the longest prefix match that the prefix matching logic 240 locates.

At a high level, a longest prefix matching algorithm receives an input key, typically comprising a string, list, sequence, or array of numbers, characters, or bits, and determines which prefix from a set of prefixes is the longest prefix that matches the input key (i.e. the longest-matching prefix in the set). A prefix "matches" an input key for the purposes of a longest prefix match algorithm if the input key begins with the prefix. The longest prefix match is the longest prefix in the set that matches the input key.

Using an example of an input key and set of prefixes that each comprise a string of letters, each of the prefixes "a", "axj", and "axjiiab" matches a hypothetical input key "axjiiabpo", whereas the prefixes "axy", "bxji", and "xjiiab" do not match the input key.

Although prefix matching is often described herein with respect to matching address-based input keys to address prefixes, it will be recognized that prefix matching logic 240 may also or instead be configured to match any type of input key to any type of prefix.

2.7. Multi-Stage Implementation of Prefix Table

In an embodiment, for efficiency of access and/or other purposes, a prefix table 260 is implemented using certain optimized hardware-based memory structures within system 200. This implementation of the prefix table 260 is also referred to herein as the "working" representation of the prefix table 260. That is, in an embodiment, to implement the longest prefix match algorithm, system 200 need not necessarily access or generate a single "table" structure that stores the complete prefix table 260. Rather, a collection of data structures collectively stores the table 260 in a manner that is more quickly accessible to prefix matching logic 240. Hence, in an embodiment, a prefix table 260 should be understood as a logical construct that is represented or described by this collection of data structures, rather than an actual table structure that is found in system 200.

Figure 3:
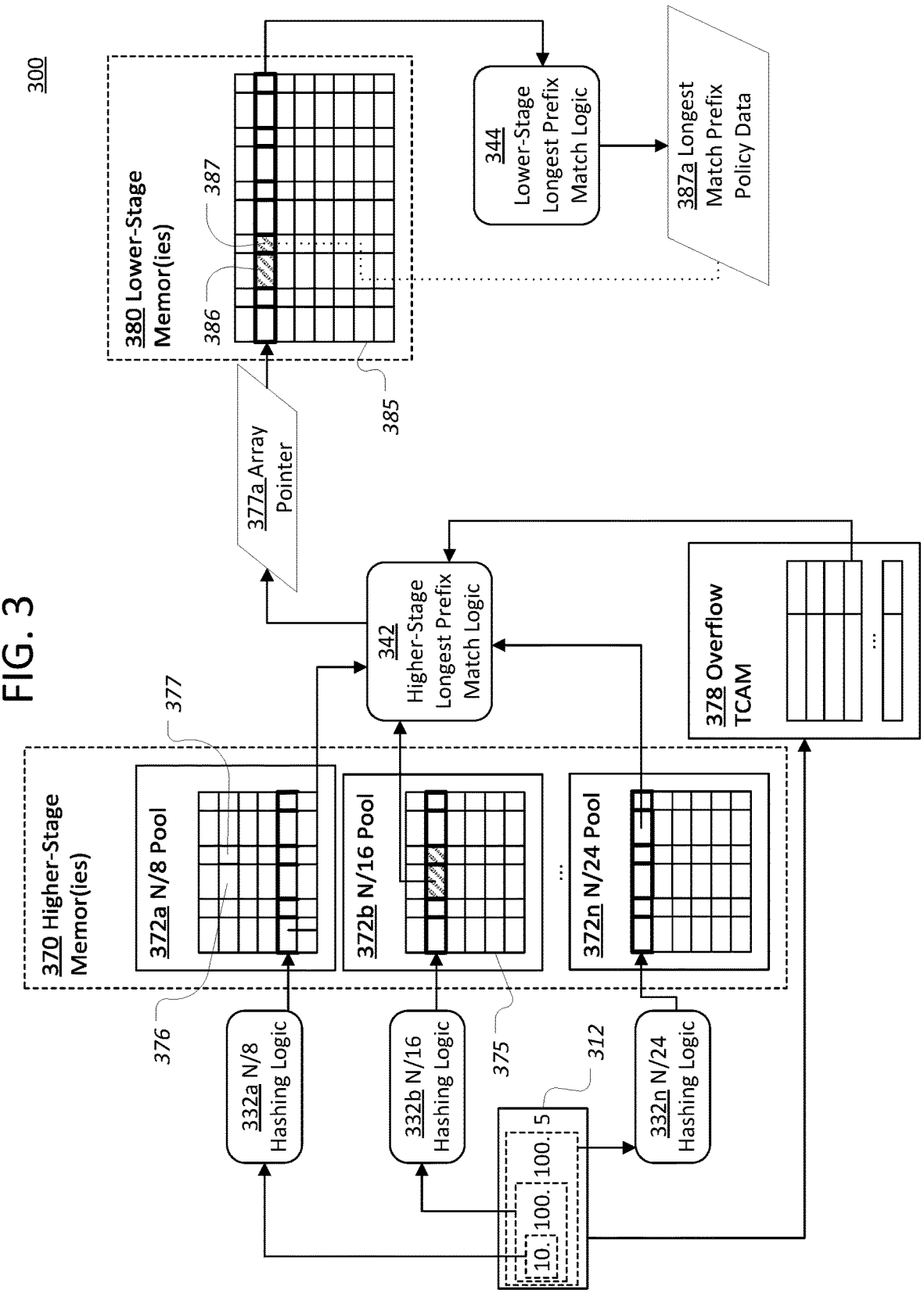
FIG. 3 illustrates elements of an example prefix matching logic configured to determine a longest prefix match in a prefix table implemented using higher-stage prefix pools and lower-stage prefix arrays.

According to an embodiment, the working representation of a prefix table 260 includes higher-stage prefix pools 270, whose entries may be linked to different arrays in a set of lower-stage prefix arrays 280. Example embodiments of the higher-stage pools 270, lower-stage prefix arrays 280, and associated prefix matching logic 240 are presently described with respect to FIG. 3. FIG. 3 illustrates elements of an example prefix matching logic 300 configured to determine a longest prefix match in a prefix table implemented using higher-stage prefix pools 372 and lower-stage prefix arrays 385, according to an embodiment. Higher-stage prefix pools 372, lower-stage prefix arrays 385, and prefix matching logic 300 are non-limiting examples of higher-stage pools 270, lower-stage prefix arrays 280, and prefix matching logic 240, respectively.

Lower-Stage Arrays

Each of the lower-stage prefix arrays 385 stores a different set of prefix entries. Each member of an array 385 is a prefix entry that indicates a prefix 386 (referred to as a "lower-stage prefix" 386) and associated prefix data 387. The prefix entry may store the lower-stage prefix 386 in any suitable form, including CIDR notation. Generally, the lower-stage prefix entry will indicate both a length of the prefix 386 and the specific sequence of characters, numbers, or bits that constitutes the prefix 386. In an embodiment, the lower-stage prefix 386 need not necessarily be stored in its entirety, but rather the prefix entry may simply store a lower portion of the lower-stage prefix 386, from which the lower-stage prefix may be resolved by adding or concatenating the lower portion with a higher-stage prefix 375 that pointed to the array 385 in which the prefix entry is found. The associated prefix data 387 may include any suitable data, but will typically include at least some policy data, such as an instruction to forward a data unit to a specific port or queue, or any other indication of an action to take.

The prefix arrays 385 may be stored using any suitable array-based constructs. For example, each prefix array 385 may be stored as separate and distinct addressable row in a lower-stage memory 380. In an embodiment, each member of an array 385 may be stored within a separate and distinct memory construct. For instance, each row used to store an array may be divided into distinct blocks. Each prefix entry may be fixed in size (e.g. the size of a block), or an entry may span multiple blocks, depending on the embodiment. In some embodiments, arrays 385 may be limited in size (e.g. a maximum number of bits in a row, a maximum number of blocks used, etc.). These and other constraints related to the underlying storage of the arrays 385 may affect the prefix table management logic 250 described subsequently.

Of course, prefix arrays 385 may be stored in a variety of other forms and need not be limited to any specific form. For example, in an embodiment, the policy data need not necessarily be stored inside the array 385, but rather the lower-stage prefix data 387 may include a pointer or other linking data by which the policy data is located.

Higher-Stage Pools

Meanwhile, higher-stage prefix pools 372 each comprise a number of slots 375. In each slot, depending on the embodiment, one or more entries for higher-stage prefixes may be stored. Some or all of the entries in the higher-stage prefix pools 372 may include a pointer or link to an array 385. Such an entry may store a prefix (referred to as a "higher-stage prefix" 376) that is common to all of the lower-stage prefixes 386 in the prefix array 385 to which the higher-stage entry points or is otherwise linked. In essence, each such higher-stage entry stores a prefix for a set of lower-stage prefixes 386, and acts as an index by which the set of lower-stage prefixes 386 may be located.

Like lower-stage prefix entries, higher-stage prefix entries may include data that indicates both a prefix (i.e. the higher-stage prefix 376) and associated prefix data 377. As with the lower-stage prefixes 386, higher-stage prefixes 376 may be stored in any suitable form. However, the prefix data 377 for a higher-stage prefix 376 may include a pointer or other suitable linking data to a memory address for a lower-stage prefix array 385.

The higher-stage prefix pools 372 are depicted individually as pools 372a-n. There may be any number of pools 372. The pools 372 themselves are divided into addressable slots 375 within one or more higher-stage memories 370. The pools 372 may have any number of slots 375. In some embodiments, the number of slots 375 in one pool 372a may differ from the number in another pool 372b.

In an embodiment, a higher-stage prefix entry may only be stored in a slot 375 that is mapped to the higher-stage prefix by some mapping logic associated with pool 372, such as by the depicted hashing logics 332. In an embodiment, there is only one slot 375 in each pool that can be mapped to a given higher-stage prefix 376. However, there may be a limited number of slots 375 in a pool 372, and the mapping logic may therefore map many prefixes to the same slot 375. If the slot 375 to which a prefix 376 is full, then the prefix 376 cannot be stored in the pool 372, even if other slots 375 in the pool 372 are empty. Example fallback mechanisms for storing the prefix 376 under such circumstances are described in other sections.

Higher-stage prefixes 376 may or may not be duplicated in lower-stage arrays 385. Duplication may be necessary if, for instance, the higher-stage prefix entries do not store policy data, or to simplify the lower-stage prefix matching logic 344. On the other hand, in some embodiments, lower-stage prefix matching logic 344 may be configured to consider the higher-stage prefix 376 that pointed to an array 385 to be a member of the array 385, without the higher-stage prefix 376 actually being stored therein. In such a case, the associated higher-stage prefix data 377 may include, in addition to a pointer to an array 385, policy data (or linking data thereto).

Moreover, in some embodiments, the higher-stage prefix data 377 for some of the higher-stage prefix entries may include policy data, without a pointer to a lower-stage array 385. In such cases, the stored policy data may be utilized without further consulting any lower-stage prefix array 385.

In an embodiment, higher-stage prefixes 376 need not necessarily be "real" prefixes that are associated with policy data, but may in at least some cases be "virtual" prefixes that simply serve as an index for locating the appropriate lower-stage prefix array 385 for an input key 312.

In an embodiment, each pool 372 is associated with a corresponding prefix length. For instance, in the depicted embodiment, pool 372a is associated with a prefix length of 8, pool 372b is associated with a prefix length of 16, and pool 372n is associated with a prefix length of 24. The associated length of each pool 372, as with the number of pools 372, may vary depending on the implementation, and need not necessarily follow a specific pattern or arrangement. For instance, in one implementation there might be pool prefix lengths of 0, 4, 12, 20, 21, 22, and 24, while in another implementation there might be pool prefix lengths of 4, 12, 20, and 28. The techniques described are not specific to any particular arrangement of prefix lengths.

In some embodiments, each pool 372 has a different associated length. In other embodiments, two or more pools 372 may have a same prefix length. For instance, in systems in which one prefix length predominates, there might be two or more pools 372 dedicated to that prefix length. In an embodiment, the prefix length of each pool is user-configurable (e.g. as a boot-time parameter).

In an embodiment, the associated prefix length is a minimum prefix length, meaning that all higher-stage prefixes 376 in a given pool 372 are of a length at least as long as the minimum prefix length. However, a prefix 376 need not always be stored in the pool 372 whose minimum prefix length is closest to its prefix length. In yet other embodiments, the associated prefix length of a pool 372 need not necessarily have any significance to the lengths of the prefixes 376 stored therein, but may rather be relevant only to the slot mapping logic(s) and/or the prefix table management logic 250.

In an embodiment, a prefix may have multiple associated prefix lengths. Each prefix length may be associated with a different type of data unit. For example, a same pool might be assigned to a first prefix length for IPv4 traffic (e.g. /8) and a second prefix length for IPv6 (e.g. /32). Different mapping logic might be utilized for the different types of traffic. In the IPv4/IPv6 example, for instance, the input key for IPv4 traffic might be truncated to the first prefix length, while the input key for IPv6 traffic might be truncated to the second prefix length. In such an embodiment, both IPv4 and IPv6 prefixes could be stored in the same slot, with the 128 bit IPv6 prefixes consuming larger entries or multiple entries relative to the IPv4 prefixes.

Prefix Matching Logic

Prefix matching logic 300 comprises two general stages—higher-stage longest prefix match logic 342 ("higher-stage logic") and lower-stage longest prefix match logic 344 ("lower-stage logic"). The prefix matching logic 300 is configured to input an input key 312, such as described in other sections. The higher-stage logic 342 is then configured to identify the entry in the higher-stage prefix pools 372 whose prefix is the longest match for the input key 312 from the higher-stage prefix pools 372.

Rather than compare the input key 312 to each individual higher-stage prefix 377 in each pool 372, the higher-stage logic 344 is configured to only compare the input key 312 to a subset of the higher-stage prefixes 376 in the pools 372. Specifically, the higher-stage logic 342 may be configured to only compare the input key 312 to the set of all higher-stage prefixes 376 that are stored in slots 375 that are mapped to the input key 312. All other slots 375 in the pools 372 are ignored, thereby reducing the number of read operations for the pools 372.

Prefix matching logic 300 determines which slots 375 are mapped to an input key 312 using one or more mapping logics, such as the depicted hashing logics 332. A mapping logic accepts an input key 312 as input and, based thereon, outputs data indicating a number or address of a slot 375 in a given pool 372 that is mapped to the input key 312. The output may be the address itself, a slot number, or other data by which such an address may be resolved.

The mapping logic(s) utilized by prefix matching logic 300 should be the same as the mapping logic(s) utilized by prefix table management logic 250 to determine where to store a prefix, as discussed subsequently, so that the slot used to store a prefix matches the slot located when executing the mapping logic on an input key that shares the prefix. Although hash functions are given as a specific example of the mapping logic, other mapping techniques may also or instead be utilized, such as other types of functions or even mapping tables.

In an embodiment, some or all of the pools 372 may have different mapping logics. For example, each pool 372 is depicted as being associated with different hashing logic 332. The hashing logics 332 may differ in one or both of the specific hashing algorithm used and in the length of the key that they hash. For instance, hashing logic 332a may hash an eight-bit input key, while hashing logic 332b may hash a sixteen-bit input key. If input key 312 is larger than the input key that a particular hashing logic 332 hashes, the hashing logic 332 truncates the input key 312 to the appropriate size. Hence, hashing logic 332a hashes the first eight bits of input key 312, while hashing logic 332 hashes the first sixteen bits of input key 312. In an embodiment, the size of the key that the hashing logic 332 hashes is the same as the associated prefix length of the pool 372 for which the hashing logic 332 is being utilized to locate a slot 375. Hence, since pool 372n is associated with a prefix length of twenty-four, the associated hashing logic 332n hashes a twenty-four-bit input key.

After determining slots 375 that are mapped to the input key 312, the prefix matching logic 300 reads the prefix entries at the indicated slots, thereby reading a group of higher-stage prefixes 376. The higher-stage logic 342 compares the input key 312 to higher-stage prefixes 376 in this group, and identifies the longest-matching higher-stage prefix within the group. Depending on the embodiment, the higher-stage logic 342 may compare the entire group all at once, or the higher-stage logic 342 may first find the longest matching higher-stage prefix in each slot 375 that it reads, and then find the longest-matching higher-stage prefix out of the longest-matching higher-stage prefix from among the longest matching higher-stage prefixes in each read slot 375.

Depending on the embodiment, this may or may not involve reading a slot 375 in each pool 372. For instance, in an embodiment, at least some of the pools 372 may not necessarily be read concurrently. If a matching prefix 376 has already been located in a first pool 372 whose associated length is greater than a second pool 372, the mapped slot 375 in the second pool 372 may be skipped or even not identified. In other embodiments, however, various fallback logic may allow for longer matching prefixes 376 to be stored in pools 372 with shorter associated lengths, in which case the foregoing optimization might not be valid.

Similarly, even when all higher-stage prefixes in mapped slots 375 have already been read, the comparison operation need not actually evaluate the input key 312 against shorter prefixes when a longer-matching prefix has already been found. To simplify explanation, however, it will be understood that comparing an input key to a set of prefixes may involve utilizing the prefix length information to skip evaluation of shorter prefixes in the set once a longer-matching prefix has already been found. This applies to any set of prefixes, regardless of whether in the higher-stage or lower-stage.

The entry for the longest-matching higher-stage prefix may include or otherwise be associated with a pointer or address 377a for a memory location in which a lower-stage prefix array 385 is found. If so, the prefix matching logic 300 reads the corresponding prefix array 385, in full or in part. Lower-stage logic 344 then compares the input key 312 to lower-stage prefixes 386 in the corresponding prefix array 385. The lower-stage logic 344 selects the prefix entry in the array 385 whose lower-stage prefix 386 is the longest match for the input key 312.

Because of the manner in which the higher-stage prefix pools 372 and lower-stage prefix arrays 385 are organized, this longest-matching lower-stage prefix is guaranteed to be the longest-matching prefix in the prefix table for the input key 312, thus saving the expense of reading lower-stage prefixes found in other arrays 385. The prefix data 387 associated with longest-matching lower-stage prefix entry is then read to determine the policy 387a (or policies 387a) used to handle traffic associated with the input key.

For example, consider the set of prefixes 192.168.14.0/24, 192.168.18.0/24, and 192.168.19.0/24. Prefix entries for each prefix in this set of prefixes may be stored as part of a first array 385, while prefix entries for other prefixes, such as 172.0.0.0/8 or 10.0.0.0/4 may be stored in other lower-stage arrays 385. The higher-stage prefix pools 372 may include a higher-stage prefix entry for a virtual prefix 192.168.0.0/19, that points to this first array 385. When the longest matching prefix in the higher-stage prefix pools 372 for an input key (e.g. 192.168.18.4) is 192.168.0.0/19, the input key is then compared to the set of lower-stage prefixes in this first array 385 to determine the longest prefix match in the prefix table 260 for the input key (e.g. 192.168.18.0/24).

Overflow TCAM

Optionally, higher-stage logic 342 may further be configured to include at least one prefix from an overflow ternary content-addressable memory ("TCAM") 378 (or any other content-addressable memory ("CAM")) in the group of higher-stage prefixes against which the input key 312 is compared. The overflow TCAM 378 may be utilized, for instance, to store higher-stage prefixes that for various reasons could not be stored in a slot 375. The overflow TCAM 378 might also or instead be utilized to store certain prefixes for various strategic reasons, such as those that are accessed most frequently.

In contrast to pools 372, the input key 312 must be compared to the prefix in each slot of the TCAM 378 in order to determine longest matching prefix for the input key 312 in the TCAM 378. However, on account of the nature of the TCAM 378, all of the slots in the TCAM 378 may be read at the same time, thus allowing the TCAM 378 to provide a higher-stage prefix to the higher-stage logic 342 in approximately the same amount of time as it takes to read a single slot from a pool 372, or less.

Just as with the slots 375 in the prefix pools 372, each slot in the overflow TCAM 378 may include a higher-stage prefix and associated prefix data, which may or may not point to a lower-stage prefix array 380.

Memory Architectures

One example implementation of a prefix table, described in the afore-mentioned application "Enhanced Prefix Matching," involves a bifurcated memory representation of a prefix table that includes prefix index entries linked to prefix arrays comprising prefixes similar to the presently described lower-stage prefixes. In some such implementations, all of the prefix index entries are stored together in a TCAM or another CAM, while prefix arrays are stored in a random-access memory ("RAM"). A TCAM is a specialized type of high-speed memory that searches its entire contents in a small number of clock cycles, or even just a single clock cycle. Meanwhile, only a portion of a RAM (e.g. only a single row or small set of rows) can be read in a similar amount of time. Hence, while costly, a TCAM may be significantly more efficient for a longest prefix match algorithm than RAM. Hence, the use of a TCAM for prefix index entries allows such implementations to be highly efficient.

However, in contrast to these and other implementations, the present embodiments utilize higher-stage prefixes arranged in distinct pools, such as pools 270 or 372. This arrangement, in combination with presently described mechanisms and techniques for locating a higher-stage prefix match in a set of pools without reading the entire set of pools, may, in certain contexts, provide certain advantages over the bifurcated memory representation and/or other prefix table implementations.

Moreover, in some embodiments, at least some of the higher-stage prefix pools are not stored in a CAM at all. This may potentially reduce the expense, space, and/or power required to implement a prefix table, which may be desirable in certain contexts. For instance, in an embodiment, the higher-stage memory or memories in which pools 372 are stored may be random-access memories. Because only the slots 375 that are mapped to an input key 371 need be read from the pools 372, RAM-based storage of the higher-stage prefixes 376 may nonetheless provide performance reasonably comparable to that of architectures in which higher-stage prefixes are stored entirely in a CAM.

In an embodiment, some or all of the higher-stage prefix pools 270 may be stored in a first set of one or more memories, such as higher-stage memory 370, while each prefix array 280 is a row in a second memory, such as lower-stage memory 380, that is entirely distinct from the first set of one or more memories. In an embodiment, the first set of memories may include multiple banks of RAM, with each bank storing a different pool 270. For example, each pool 372 may be a different SRAM bank. In another embodiment, pools 270 may correspond to different regions of a same RAM. Although the multi-bank embodiment may provide certain advantages over a single-bank embodiment from a standpoint of allowing concurrent access to each higher-stage pool 270, both embodiments may nonetheless provide certain advantages over other implementations.

Example Working Representation

Figure 4:
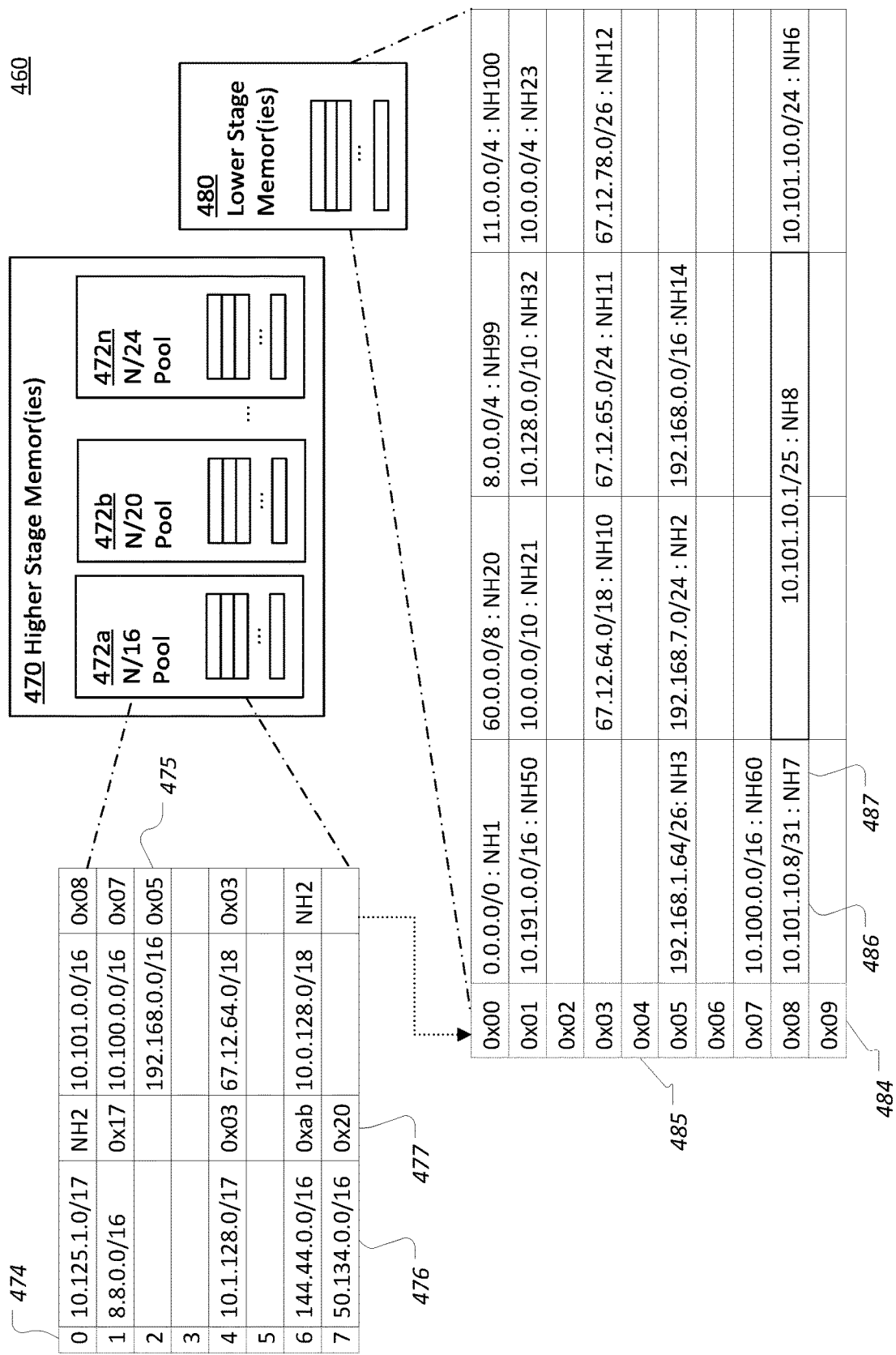
FIG. 4 illustrates an example working representation of a prefix table stored across a first set of one or more memories, also referred to as higher-stage memories, and a second set of one or more memories, also referred to as lower-stage memories.

FIG. 4 illustrates an example working representation of a prefix table 460 stored across a first set of one or more memories 470, also referred to as higher-stage memories 470, and a second set of one or more memories 480, also referred to as lower-stage memories 480, according to an embodiment. Prefix table 460 is an example of prefix table 260, though prefix table 260 may take other forms, and prefix table 460 may be utilized in systems that differ from system 200.

The first memory 470, which may be an example of higher-stage memory 370, stores higher-stage prefix entries in slots 475 of multiple pools 472a-n (collectively pools 472). Each slot 475 is capable of storing, depending on the embodiment, at least one higher-stage prefix 476 with accompanying higher-stage prefix data 477. The higher-stage prefix data 477 may be either a policy, as in the case of the first entry of slot 1 and the last entry in slot 6, or in the cases of the other occupied slots, an address 477 that indicates the location 484 in the second memory 480 at which the prefix array for the higher-stage prefix 476 is stored.

Each slot 475 has a slot number 474 or other address by which the slot 475 may be accessed and referred. The address 474 may or may not be relative to the pool 472, depending on the embodiment and input key mapping function(s) utilized. Not all entries or even slots 475 need be occupied. The size of each entry in a slot 475 may be chosen based on the size of the information to be stored. For instance, for IPv4 prefixes, the size may be thirty-two bits (for the IPv4 address) plus six bits (for the length of the prefix), plus the number of bits necessary to encode policy data and/or addresses in the second memory 480. IPv6 prefixes, on the other hand, may require 128 bits for the IPv6 address and eight bits for the length of the prefix.

In an embodiment, to reduce memory usage, each prefix 476 may be truncated to a certain length, such as to the prefix length of the prefix, cutting off the insignificant bits (e.g. the 0.0 in 10.100.0.0/16). In an embodiment, each pool 472 may be associated with a different prefix length, and the sizes of the slots stored therein may be adapted to better take advantage of this truncation.

The second memory 480, which may be an example of lower-stage memory 380, is divided into addressable units referred to herein as rows 485, which are used to store a collection of prefix arrays. Each row 485 has an address 484, which may correlate to one of the addresses specified in the higher-stage prefix data 477. In an embodiment, each row 485 may be utilized to store any sort of data. That is, some rows 485 may store prefix arrays, while other rows may store other system data. Exactly which rows 485 are allocated to prefix arrays may, in such embodiments, depend on when prefix arrays are created and what is already stored in memory 480 at that time. In yet other embodiments, the second memory 480 is dedicated exclusively to storing prefix entries.

A row 485 may store any number of prefix entries, depending on the sizes of the prefix entries, the sizes of the rows 485, and any constraints imposed by the manner in which entries are stored in the rows 485. For instance, in an embodiment, one such constraint may be that each entry must be stored in a different set of one or more discrete blocks within the rows 485. It will be recognized that a variety of similar space allocation and management constraints may also or instead limit the space available within a row 485 to store an entry. Moreover, not all blocks need be occupied within a row, nor need the occupied blocks be contiguous.

Each lower-stage prefix entry includes a lower-stage prefix 486 and associated lower-stage prefix data 487. For example, as illustrated, the first entry of row 0x00 stores the prefix 0.0.0.0.0/0 along with the policy data "NH1." "NH1" is a placeholder used for illustrative purposes, and the policy data may itself be longer. For instance, the policy data may indicate one or more "next hop" addresses, actions to perform, and so forth. Or, in an embodiment, "NH1" may be a pointer or other reference to policy data stored in another location.

In an embodiment, prefix entries may be added (assuming space is available) or removed from a row 485 over time for various reasons, such as the addition or removal of new paths or forwarding instructions, re-optimization of the storage of the prefixes in memory 470/480, and so forth. Moreover, in an embodiment, the order of prefix entries in a row 485 may or may not be sorted by prefix length, depending on the embodiment.

In an embodiment, to further conserve storage, only the incremental portion of a lower-stage prefix 486, relative to that which is stored in the corresponding higher-stage prefix 476, need be stored in the second memory 480. For example, in row 0x05, since the corresponding higher-stage prefix 476 is of prefix length sixteen, the first sixteen bits of each lower-stage prefix 476 in row 0x05 must be the same, and therefore need not be repeated in row 0x05. Thus, for instance, the prefix 192.168.1.64/26 may be represented in the row 0x05 as simply "1.64/26," with the first sixteen bits derived from the higher-stage prefix 476. Of course, to reduce storage needs even further, the insignificant bits of each prefix may be truncated, such that 192.168.7.0/24 becomes simply 7/24, since the last eight bits are not needed. On the other hand, in some embodiments, multiple arrays might be stored in a row 485, or multiple higher-stage prefixes might point to a row 485, and hence the foregoing optimizations might not be valid.

To illustrate the use of prefix table 460 in determining a longest prefix match, consider the input key 192.168.7.78. A longest-matching higher-stage prefix would initially be selected from a higher-stage prefix pool 472. For illustrative purposes, let it be assumed that, after reading slots mapped to the input key in pools 472, 192.168.0.0/16 is found to be the longest-matching prefix in the higher-stage memories 470. An address is then read from the prefix data 477 in the slot 475 in which the longest-matching higher-stage prefix 192.168.0.0/16 is stored. This address is 0x05. Hence, the prefix array in the row 485 at address 0x05 is read, and a longest-matching lower-stage prefix 476 is selected from this row 0x05. In this case, 192.168.7.0/24 is the longest prefix match. Hence, the policy data "NH2" is loaded and processed for the input key.

Note that, in the depicted embodiment, higher-stage prefixes 476 may be repeated in their corresponding row 485, so that their policy data may be located if they are the longest prefix match for the input key. Alternatively, the policy data for a higher-stage prefix 476 could instead be stored in the prefix data 477, and thus the higher-stage prefix 476 would not necessarily need to be repeated. In this case, if there were no matching lower-stage prefixes 486 for an input key in a prefix array, the policy data stored with the matching higher-stage prefix 476 would be used instead.

2.8. Prefix Table Management Logic

In an embodiment, system 200 comprises prefix table management logic 250 that is configured to adjust the data in prefix table(s) 260 based on a variety of factors. For example, prefix table management logic 250 may be configured to recognize administrative commands that explicitly instruct the prefix table management logic 250 to add or remove address groups or adjust existing instructions for a group. Such commands may originate from components that are external to system 200, such as from a system administrator or an administrative device. Such commands may also or instead originate from components that are internal to system 200, such as a traffic manager in forwarding logic 220 or undepicted flow control components. Prefix table management logic 250 may also adjust policy data in response to events that imply changes to the forwarding instructions, such as the receipt of data units 205 that announce the availability of new paths in a network, the dropping of a certain number of data units 205 to a destination, the application of certain flow control measures, or any other suitable event.

Prefix table management logic 250 may comprise various logic for determining how to arrange the prefixes that it stores. For instance, prefix table management logic 250 may utilize a tree-based approach, as described in "Enhanced Prefix Matching." Such approaches may involve a variety of steps that are outside the scope of this disclosure, such as organizing prefixes into subtrees, identifying root nodes to store as indexes in higher-stage memor(ies), storing the remaining nodes of a subtree in a prefix array, creating virtual prefixes and reorganizing subtrees as needed for optimization or other purposes, and so forth. Alternatively, any other suitable approach may be utilized for arranging the working representation of the prefix table. Whatever approach is utilized, the prefix table management logic must generally decide whether a new prefix is to be a lower-stage prefix or a higher-stage prefix.

When prefix table management logic 250 has determined that a new prefix is a lower-stage prefix, adding the prefix to a lower-stage array 280 is a relatively straight-forward process. The prefix table management logic may simply locate the longest-matching higher-stage prefix for the new prefix, follow associated address data to the corresponding array 280, and store the new prefix in the array 280. If the array 280 is full, any suitable logic may be utilized for dividing the array 280 into multiple arrays 280. If no array 280 is pointed to, any suitable logic may be utilized to allocate and create a new array 280.

When prefix table management logic 250 has determined that a new prefix is a higher-stage prefix, the prefix table management logic 250 may take various steps to identify the pool 270 and slot into which the new prefix is to be stored. The prefix table management logic 250 may begin by identifying a primary candidate pool 270 to attempt to place the new prefix into. The primary candidate pool 270 may be identified using various approaches, depending on the embodiment. For example, in one embodiment, the primary candidate pool 270 is the pool 270 whose associated prefix length is closest, without exceeding, the length of the new prefix. As another example, the primary candidate pool 270 may simply be the pool 270 with the longest or shortest associated prefix length. Or the primary candidate pool 270 may be selected without regard to any associated prefix length.

Once a candidate pool has been identified, prefix table management logic 250 may utilize mapping logic associated with the pool to identify a slot number or address within the candidate pool 270 at which to store the new prefix. The mapping logic should correspond to the mapping logic utilized by the prefix matching logic 240 for the pool, but may otherwise take any suitable form.

Although some embodiments may share mapping logic for all of the pools 270, in an embodiment it may be advantageous if the slot number to which a prefix is mapped changes depending on the pool 270. For instance, it may be advantageous if a prefix that mapped to slot 5 in pool 372b ends up being mapped to slot 6 in pool 372a, while a second prefix that mapped to slot 5 in pool 372b ends up being mapped to slot 1 in pool 372a, thus providing prefix table management logic 250 with increased flexibility for storing prefixes. A hash function, where the prefix serves as the input key, is a non-limiting of a suitable mechanism for accomplishing the foregoing. It may furthermore be advantageous to use different input key lengths for the hash function, depending on the pool, such that the same hash function may be re-used to provide different results for different pools. Hence, as already explained, hashing logic for a pool 270, such as a hashing logic 332, may truncate the prefix to a certain pool-specific length before inputting the prefix into the hash function for the pool 270.

If the slot mapped to the new prefix in the primary candidate pool 270 is not already full, then the prefix table management logic 250 may simply store the new prefix in an unoccupied entry within the mapped slot. Optionally, associated policy data may be stored with the new prefix in the entry. Additionally, or instead, a new lower-stage prefix array 280 may be allocated for the new higher-stage prefix, and a pointer thereto stored in the entry with the new higher-stage prefix.

If the slot mapped to the new prefix in the primary candidate pool 270 is already full with existing prefix(es), then the prefix table management logic 250 may revert to various fallback measures. The exact sequence of fallback measures may vary depending on the embodiment. The measures may include, for instance, storing the new prefix to an available slot in another pool, moving an existing prefix to an available slot in another pool, or storing the new prefix in an overflow TCAM. Note that these fallback measures may be combined. For instance, the fallback measures may include identifying a second candidate pool, moving an existing entry from a slot to which the new prefix is mapped in the second candidate pool to yet a third candidate pool, and storing the new prefix in the second candidate pool.

In an embodiment, the fallback measures may prove more effective in embodiments where different prefixes map to different slots in different pools. This may decrease the likelihood that all slots mapped to prefix are already occupied.

In some cases, the prefix table management logic 250 may exhaust all fallback measures without finding a suitable place to store a new higher-stage prefix. This may occur even if there are empty slots in the higher-stage pools 270, since a new prefix may only be stored in slots mapped to the new prefix. However, this will typically not occur if there is still space available in an overflow TCAM. In any event, when all fallback measures are exhausted, an error condition is triggered, in that the new prefix cannot be added to the forwarding table, and the implementing device may take various actions to deal with the error condition that are outside the scope of this disclosure.

Prefix table management logic 250 may further include logic for removing prefixes from the prefix table 260, changing policy data associated with a prefix, re-optimizing the prefix table 260, and any other actions necessary for prefix table management. However, the exact manner in which these actions are performed outside the scope of the present disclosure, and example techniques may more specifically be found, without limitation, in the example implementations already referenced.

2.9. Miscellaneous

Device 200 illustrates only one of many possible arrangements of components configured to provide the functionality described herein. Other arrangements may include fewer, additional, or different components, and the division of work between the components may vary depending on the arrangement. For example, in an embodiment, prefix table 260 may more generally be utilized for purposes other than processing network data units 205. Hence, for example, depending on the nature of the input key, the forwarding logic 220 may be omitted or more generally be characterized as data handling logic, and other components of system 200, such as ports 210/290, may even be omitted.

For illustrative purposes, this disclosure describes a number of embodiments with respect to the context of forwarding policies that are applied based on matching destination IP addresses (e.g. IPv4 or IPv6) to IP prefixes. However, the same techniques are also applicable to applying any type of policy, based on matching other types of prefixes to other types of data unit information, including, but not limited to, source or other IP addresses, media access control (MAC) addresses, proprietary network addresses, other data unit metadata, etc. In fact, in other embodiments, the prefixes may be prefixes of any type, including strings or numbers other than addresses. The techniques may thus be generalized to locating a "longest-matching prefix" data entry for any type of input string, and taking an associated action based thereon.

In some embodiments, a lower-stage prefix may include a pointer to another prefix array 280 to be examined for the longest prefix match, in similar manner to a higher-stage prefix. Or, a higher-stage prefix may include a pointer to another set of higher-stage prefix pools. In other words, there may three or more stages of prefix matching, with intermediate stage(s) taking the form of either the higher-stage or the lower-stage already described, depending on the embodiment.

3.0. Functional Overview

The various elements of the process flows described below may be performed in a variety of systems, including systems such as system 200 described above. In an embodiment, each of the processes described in connection with the functional blocks described below may be implemented using one or more computer programs, other software elements, and/or digital logic in any of a general-purpose computer or a special-purpose computer, while performing data retrieval, transformation, and storage operations that involve interacting with and transforming the physical state of memory of the computer.

3.1. Using the Working Representation of the Prefix Table

Figure 5:
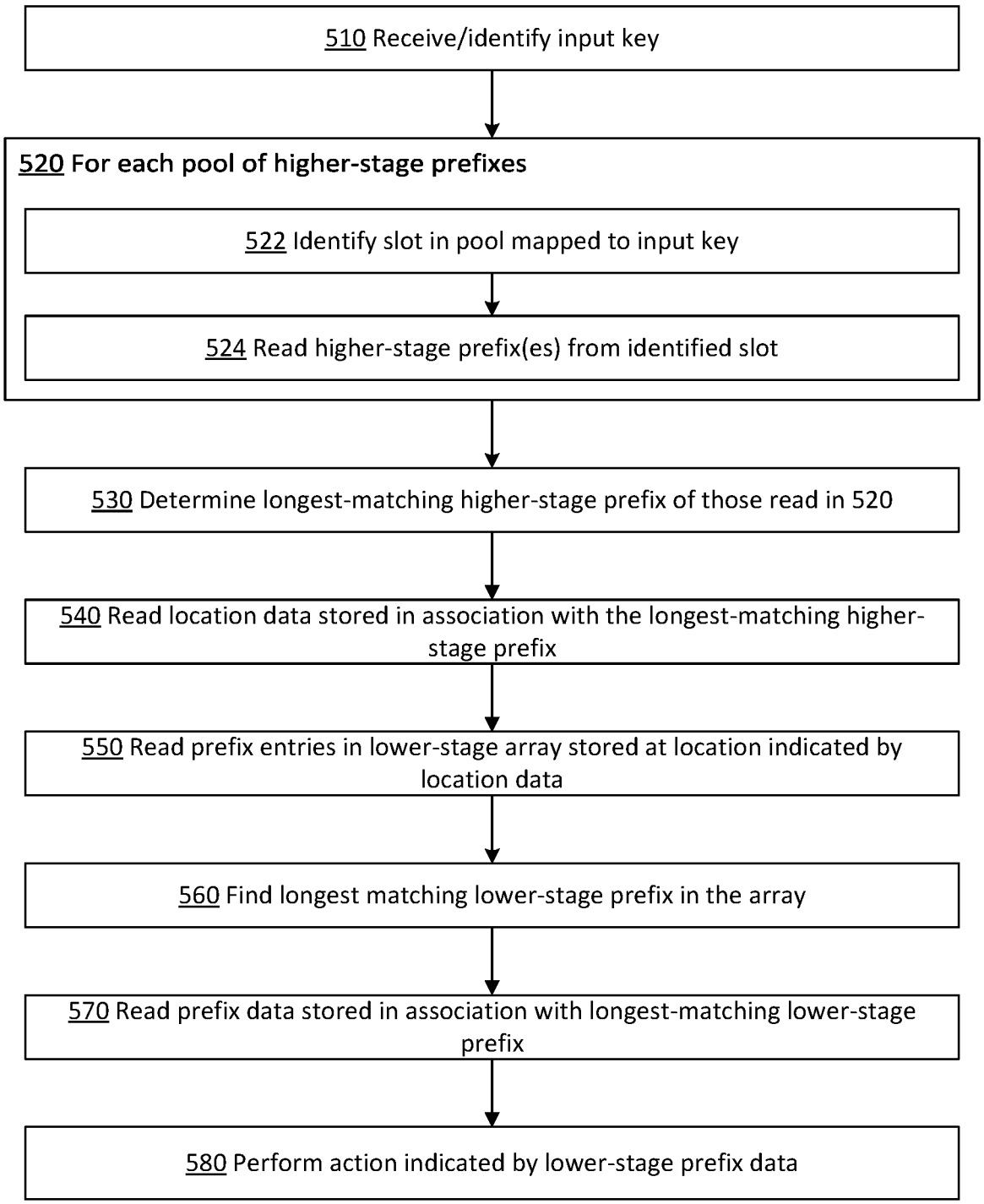
FIG. 5 illustrates an example flow for implementing a longest prefix matching algorithm using a multi-stage representation of a prefix table.

FIG. 5 illustrates an example flow 500 for implementing a longest prefix matching algorithm using a multi-stage representation of a prefix table, according to an embodiment. Flow 500 may be performed, for instance, by prefix matching logic, such as described in other sections.

Block 510 comprises receiving or identifying an input key for the longest prefix matching algorithm. The input key may take any suitable form capable of being matched against the prefixes in the prefix table.

Block 520 comprises identifying higher-stage prefixes in the higher-stage pools that are stored in slots mapped to the input key. Block 520 includes a series of subblocks that are performed for some or all of the higher-stage prefix pools, including subblocks 522 and 524. Block 520 may be performed concurrently for each pool, or incrementally over a period of time, depending on resource limitations and the memory architecture.

Sub-block 522 comprises identifying, for a given pool, the slot in the pool that is mapped to the input key. This identifying generally comprises feeding the input key as an input to some mapping logic that is configured to calculate a slot number or address within the given pool based on the input key. The mapping logic may take a variety of forms, including a mapping table, a hash function, and so forth. In an embodiment, some or all of the pools may have different mapping logic. For example, some or all of the pools may have different hash functions and/or input key lengths. In an embodiment, for instance, the input key is always truncated to the prefix length associated with a given pool.

Sub-block 524 comprises reading the higher-stage prefix or prefixes stored in the identified slot for the given pool, if any. The other slots within the pool need not be read.

Block 530 comprises determining the longest-matching higher-stage prefix of those read in block 520. This determination may involve comparing the input key to each prefix read in block 520. Or, the prefixes may be arranged from longest to shortest, such that the input key only need be compared with prefixes until a first match is found. In an embodiment, the comparison may involve multiple steps. For instance, the prefixes read from a slot may be compared first to locate the longest-matching prefix in its pool, and then the longest-matching prefixes from each pool may then be compared to locate the longest-matching higher-stage prefix.

While in some embodiments, each higher-stage pool is evaluated in blocks 520 and 530, in others this need not necessarily be the case. For example, in an embodiment, each higher-stage prefix pools may have an associated, known, or de facto maximum prefix length. The maximum prefix length may be enforced when storing prefixes in the pools, and/or calculated based on the contents of the pools. The higher-stage prefix pools may be searched incrementally (e.g. from a longest maximum prefix length to a shortest maximum prefix length). If the maximum prefix length of a certain pool is less than that of a matching prefix already found in another pool, reading and/or evaluation of the mapped prefix in the certain pool may be skipped.

Block 540 comprises reading location data stored in association with the longest-matching higher-stage prefix. For example, the longest-matching higher-stage prefix may specify an address of a row, block, or other addressable unit of data within another memory, such as an SRAM, at which a prefix array is stored.

Block 550 comprises reading prefix entries in a lower-stage prefix array stored in the location indicated by the location data. For instance, the lower-stage prefix array may be an array 280 and/or 385. The prefix entries read in block 550 are merely a subset of prefix entries in the prefix table, and thus flow 500 avoids reading all other prefixes in the prefix table. The subset includes all prefix entries that begin with the longest-matching higher-stage prefix found in block 530.

Block 560 comprises finding the longest-matching lower-stage prefix in the lower-stage prefix array. On account of the manner in which prefix table is stored, the longest-matching prefix entry within the lower-stage prefix array is also the longest-matching prefix entry within the prefix table, even though not all prefix entries in the prefix table are searched.

Any suitable technique may be utilized to determine the longest-matching prefix in the array. For instance, in an embodiment, the input key is simply compared to each prefix in the array. Or, the prefix entries may be sorted or pre-sorted by length, in similar manner to that described with respect to block 530.

In an embodiment, blocks 550 and 560 occur at least partially concurrently. The set of prefix entries is pre-sorted by length, such that the first match found will be the longest prefix match. In this case, the remaining prefix entries in the array need not actually be read. However, in other embodiments, the prefix entries will not necessarily be sorted, and the entire set must be read.

Block 570 comprises reading prefix data stored in association with the longest-matching lower-stage prefix. This data may be stored directly in the array, or a pointer to the data may be stored in the lower-stage prefix entry. The data may include policy data indicating an action to be performed, such as described elsewhere herein. Block 580 therefore comprises performing one or more actions indicated by the policy data that was read. For instance, if the actions are forwarding instructions, block 580 may comprise actions such as sending the data unit to a next hop indicated by the forwarding instructions, replicating the data unit, dropping the data unit, and/or performing other actions such as described in other sections.

Flow 500 illustrates only one of many possible flows for implementing a longest prefix matching algorithm using a multi-stage representation of a prefix table. Other flows may include fewer, additional, or different elements, in varying arrangements. For instance, in an embodiment, a mapping function may resolve a single input key to more than one candidate slot within a pool, and the contents of each of these candidate slots may be read in block 520.

3.2. Handling a Data Unit Using a Multi-Stage Prefix Table

Figure 6:
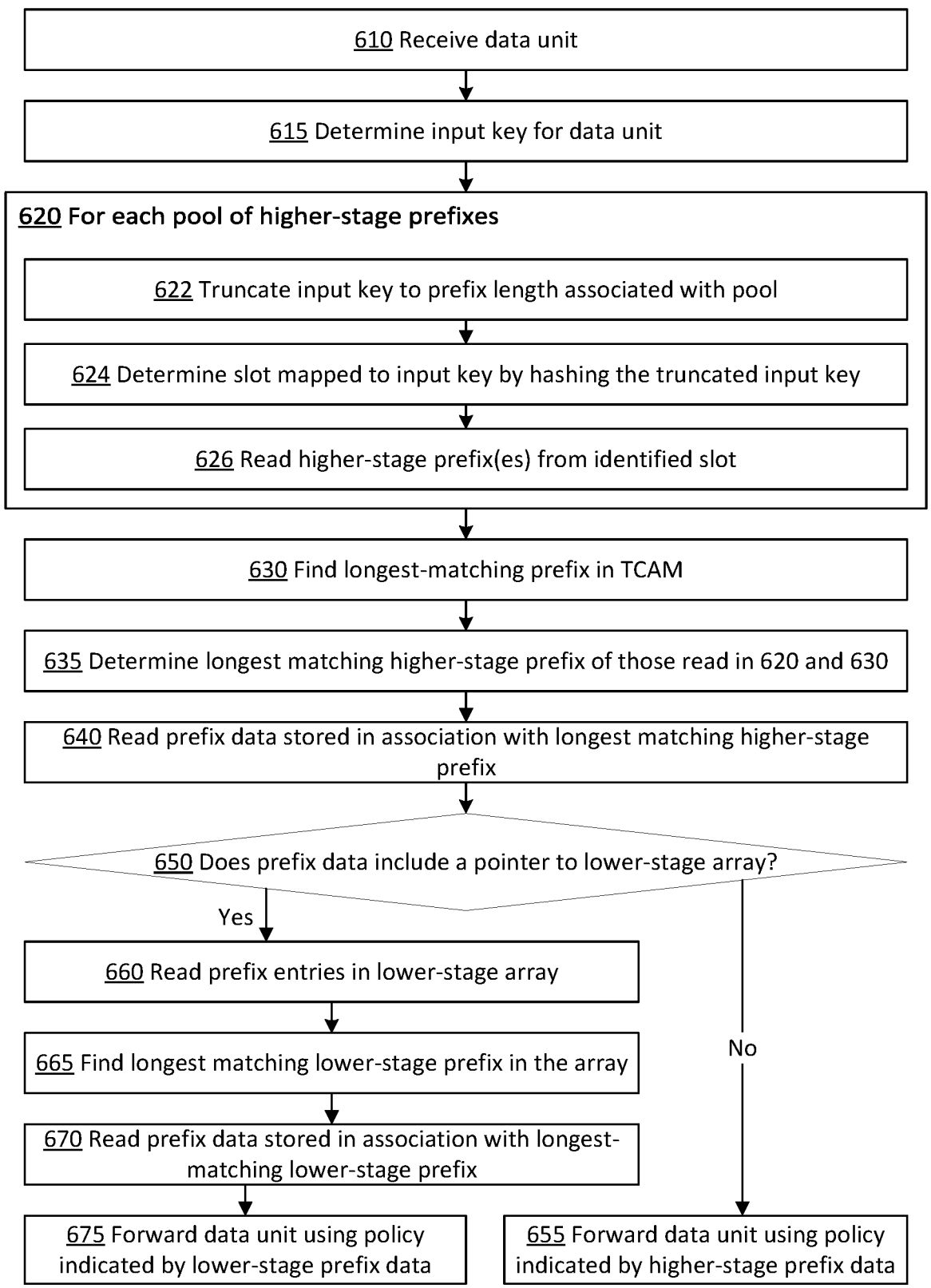
FIG. 6 illustrates an example flow for handling a data unit using a hash-based multi-stage representation of a prefix table.

FIG. 6 illustrates an example flow 600 for handling a data unit using a hash-based multi-stage representation of a prefix table, according to an embodiment. Flow 600 may be performed, for instance, by forwarding logic working together with prefix matching logic, such as described in other sections.

Block 610 comprises receiving a data unit for processing. The data unit may be any sort of data unit, received by any suitable component of the implementing system. For example, in an embodiment, the data unit may be a network packet or cell sent from an external device or otherwise relayed to the forwarding logic of the implementing device.

Block 615 comprises deriving an input key from the data unit for the longest prefix matching algorithm. The input key may take any suitable form capable of being matched against the prefixes in the prefix table. For example, the input key may be used to classify the data unit for the purposes of determining one or more actions for processing the data unit. For instance, if the data unit is an IP packet, the input key may be a destination IPv4 or IPv6 address specified in the header of the data unit, and will be used to determine a next hop address for the data unit and/or other forwarding instructions. Of course, other input keys may also or instead be derived for other types of purposes. Flow 600 may be utilized for determining actions related to any suitable type of input key, including source addresses, hash values, flow identifiers, or other identifiers.

Block 620 comprises identifying higher-stage prefixes in the higher-stage pools that are stored in slots mapped to the input key. Block 620 includes a series of subblocks that are performed for some or all of the higher-stage prefix pools, including subblocks 622-626. Block 620 may be performed concurrently for each pool, or incrementally over a period of time, depending on resource limitations and the memory architecture.

Sub-block 622 comprises truncating the input key to the prefix length associated with the pool. Each pool may have an associated prefix length, and these lengths may be different for some or all of the pools. In an embodiment, the associated prefix length is a minimum prefix length of all prefixes stored in the pool. However, in other embodiments, the associated prefix length need not be a minimum prefix length.

Sub-block 624 comprises determining a slot mapped to the input key by hashing the truncated input key using a hashing function. The hashing function may or may not be specific to the pool. Examples of suitable hashing functions include, without limitation, a cyclic redundancy check (CRC), a mod operation, and so forth. The hash function returns a value that can be used to calculate a memory address at which mapped slot is found. For example, the hash function may return a slot number or the memory address itself.

Sub-block 626 comprises reading the higher-stage prefix or prefixes from the identified slot for the given pool. The other slots within the pool need not be read.

Block 630 comprises identifying a longest-matching prefix for the input key in an overflow TCAM. The TCAM can be searched quickly, and block 630 can typically be performed concurrently with block 620.

Block 635 comprises determining the longest-matching higher-stage prefix from a group of higher-stage prefixes (i.e. the "candidate" higher-stage prefixes) consisting of those read in block 620 and the longest-matching prefix from the overflow TCAM. This determination may involve comparing the input key to each of these candidate prefixes. Or, the candidate prefixes may be arranged from longest to shortest, such that the input key only need be compared to the prefixes until a first match is found. As discussed with respect to blocks 520 and 530 above, not all pools need necessarily be read from in block 620, nor need all mapped higher-stage prefixes necessarily be compared to the input key in block 635, depending on the embodiment.

Block 640 comprises reading prefix data stored in association with the longest-matching higher-stage prefix. Block 650 comprises determining whether the prefix data includes a pointer to a lower-stage prefix array. For example, the longest-matching higher-stage prefix may specify an address of a row, block, or other addressable unit of data within another memory, such as an SRAM, at which a prefix array is stored.

If the prefix data does not include such a pointer, then the longest-matching higher-stage prefix is the longest prefix match for the input key. Flow 600 thus branches to block 655, which comprises forwarding the data unit using policy data indicated by the longest-matching higher-stage prefix. This may include steps such as reading and acting upon policy data stored directly in association with the higher-stage prefix.

Otherwise, flow 600 proceeds to block 660. Block 660 comprises reading prefix entries in a lower-stage prefix array stored in the location indicated by the location data, in similar manner to block 550. Block 665 then comprises finding the longest-matching lower-stage prefix in the lower-stage prefix array, in similar manner to block 560. Block 670 then comprises reading prefix data stored in association with the longest-matching lower-stage prefix, in similar manner to block 570.

Finally, block 675 comprises forwarding the data unit using policy data indicated by the lower-stage prefix data read in block 670.

Flow 600 illustrates only one of many possible flows for implementing a longest prefix matching algorithm using a multi-stage representation of a prefix table, and forwarding a data unit based thereon. Other flows may include fewer, additional, or different elements, in varying arrangements. For instance, block 630 may be optional, as there may be no overflow TCAM, or the overflow TCAM may be empty. Moreover, blocks 650 and 655 may be optional. Furthermore, a mapped slot may be identified using logics that do not involve a hash function and/or a truncated input key.

In an embodiment, some input keys may not match any prefix in the higher-stage pools. Such keys are not processed further beyond block 635, and a default policy may be utilized to handle data units associated with such input keys. For instance, the default policy may be to drop the data unit, or send the data unit to a diagnostic component.

3.3. Adding a New Prefix to a Higher-Stage Pool

Figure 7:
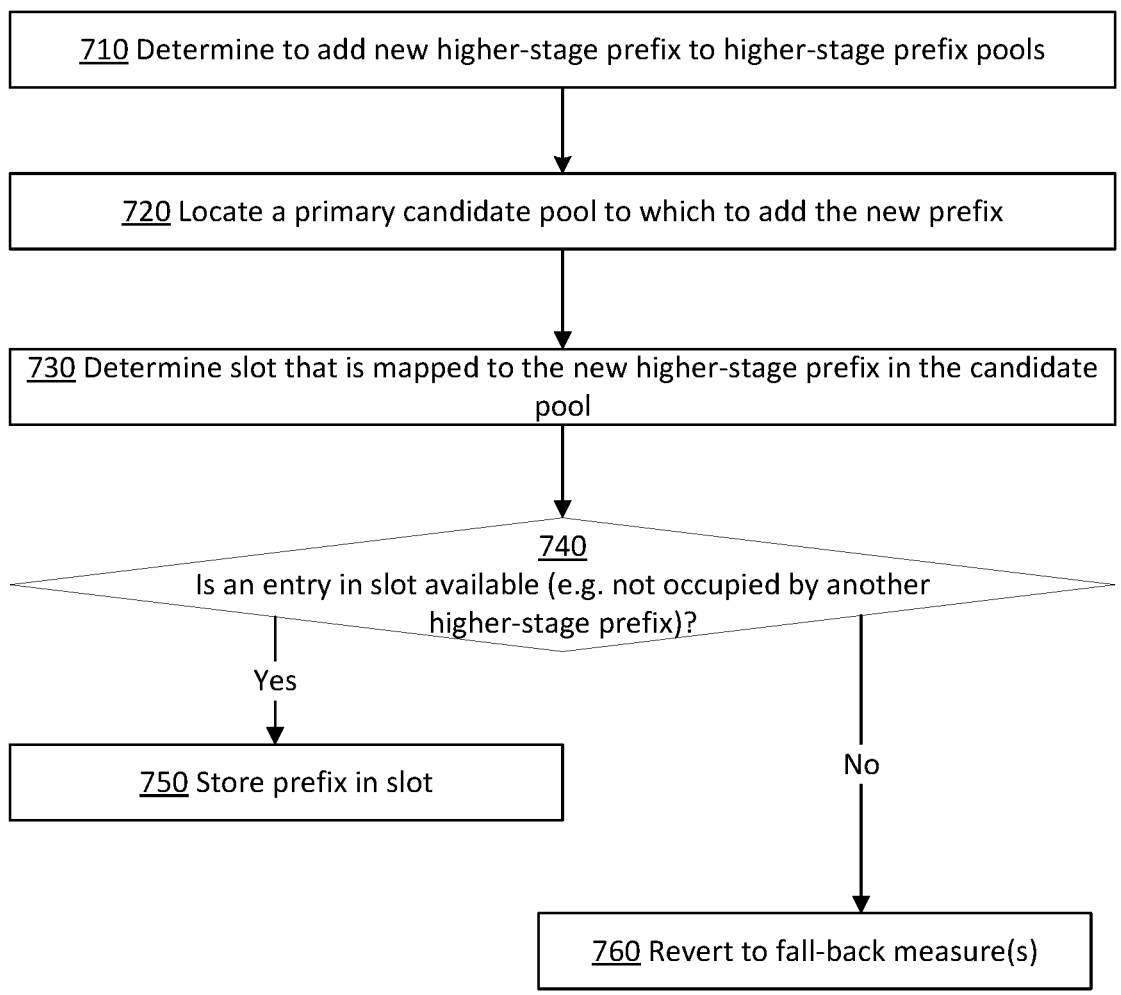
FIG. 7 illustrates an example flow for adding a new prefix to a higher-stage pool.

FIG. 7 illustrates an example flow 700 for adding a new prefix to a higher-stage pool, according to an embodiment. Flow 700 may be performed, for instance, by prefix table management logic, such as described in other sections. Flow 700 may be performed in response to various events that require changes to a prefix table, such as the addition or removal of new paths in a network, policy changes, and so forth.

Block 710 comprises determining to add a new higher-stage prefix to higher-stage prefix pools, such as to pools 270 or 372. Such a determination may be made for any suitable reason. For example, the new prefix may correspond to a new path that has recently been added to or discovered in a network, or to an existing path in the network that is being added to the higher-stage prefix pools on account of changes to a prefix tree or other prefix table-optimizing construct (e.g. because other paths have been added or removed). The new prefix may instead be a virtual prefix created to index a lower-level prefix array.

Block 720 comprises locating a primary candidate pool to which to add the new prefix. In an embodiment, each pool has an associated minimum prefix length, and the primary candidate pool is the pool whose minimum prefix length is closest to, without exceeding, the length of the new higher-stage prefix. However, in other embodiments, the primary candidate pool may be selected using other means.

Block 730 comprises determining which slot in the candidate pool is mapped to the new prefix. This may comprise, for example, inputting the new prefix into mapping logic such as a hash function, which calculates the slot number or address therefrom. In an embodiment, the mapping logic truncates the new prefix to a prefix length associated with the candidate pool (e.g. its minimum prefix length) prior to inputting it into a hashing function or other mapping function.

Block 740 comprises determining whether any entry in the mapped slot is currently available to store the new prefix. An entry is available if it is not already occupied by another higher-stage prefix. If an entry in the slot is available, then, in block 750, the new prefix is stored in the slot. The new higher-stage prefix may be associated with any relevant prefix data for the new higher-stage prefix. This may include, among other elements, depending on the new prefix, policy data and/or a pointer to a lower-stage prefix array associated with the new higher-stage prefix.

Otherwise, then prefix table management logic may revert to one or more fallback measures in block 760. These fallback measures are optional, depending on the embodiment. If no fallback measures are attempted, or all fallback measures fail, an error condition occurs, and the new prefix cannot be stored.

3.4. Falling Back to an Alternative Pool

Figure 8:
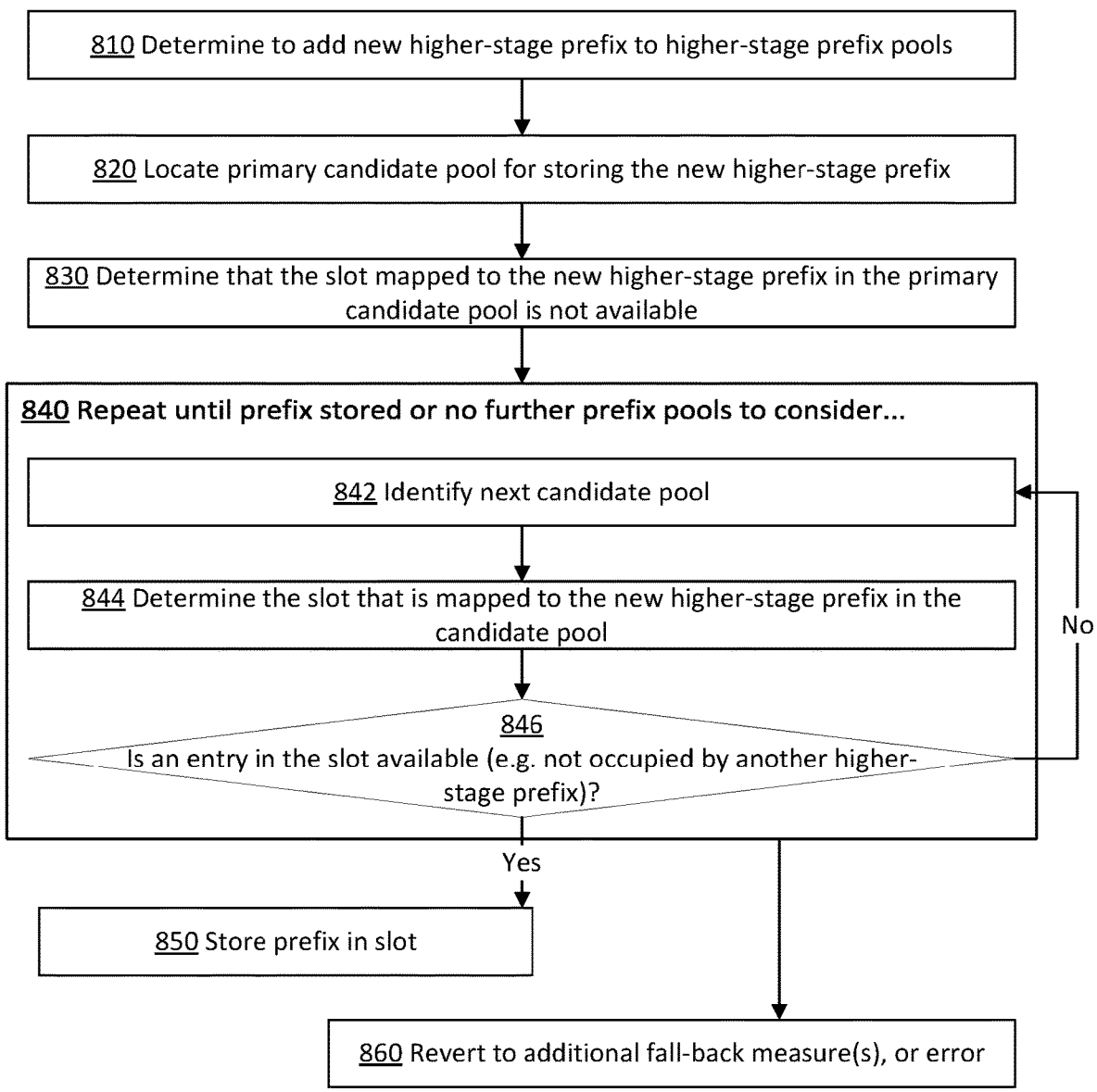
FIG. 8 illustrates an example flow for adding a new prefix to a fallback higher-stage pool.

FIG. 8 illustrates an example flow 800 for adding a new prefix to a fallback higher-stage pool, according to an embodiment. Flow 800 illustrates an example of a fallback measure that may be taken pursuant to block 760 above.

Block 810 comprises determining to add a new higher-stage prefix to higher-stage prefix pools, as in block 710 above. Block 820 comprises locating a primary candidate pool for storing the new prefix, as in block 720. Block 830 comprises determining that the slot mapped to the new prefix in the primary candidate pool is not available, as may occur in performance of blocks 730 and 740.

Block 840 comprises searching for an alternative higher-stage pool to store the new prefix in. The search involves various subblocks that may be repeated for each possible alternative pool until all of the pools are exhausted, or until the new prefix is stored.

Subblock 842 comprises identifying a next candidate pool, in similar manner to block 720. For example, in an embodiment, the next candidate pool may be the pool with the next closest minimum prefix length that does not exceed the length of the new higher-stage prefix, other than those pool(s) that have already been considered. In an embodiment, pools associated with minimum prefix lengths that are greater than that of the new prefix may be ignored for the purposes of block 840.

Subblock 844 comprises determining the slot that is mapped to the new higher-stage prefix in the candidate pool. Subblock 844 may be performed in similar manner to block 730. However, in some embodiments, different mapping logic may be used depending on the pool. For instance, whereas the mapping logic for the primary candidate pool might have been based on the first twenty-eight bits of the prefix, the mapping logic for the next candidate pool might be based on the first twenty-four bits of the prefix. Consequently, the new prefix may be mapped to a different slot number in the next candidate pool than in the primary candidate pool.

Subblock 846 comprises determining if any entry in the slot identified in block 844 is available to store the new prefix. If so, then in block 850 the new prefix is stored in an available entry in the slot. The new higher-stage prefix may be associated with any relevant prefix data for the new higher-stage prefix, as already described.

If the slot is not available, block 840 may return to subblock 842 for consideration of additional pools, if any. Or, flow 800 may proceed to block 860 to either attempt additional fallback measures, or trigger an error condition. Examples of possible fallback measures may include, without limitation, other measures described herein.

3.5. Moving an Existing Prefix to Make Room for a New Prefix

Figure 9:
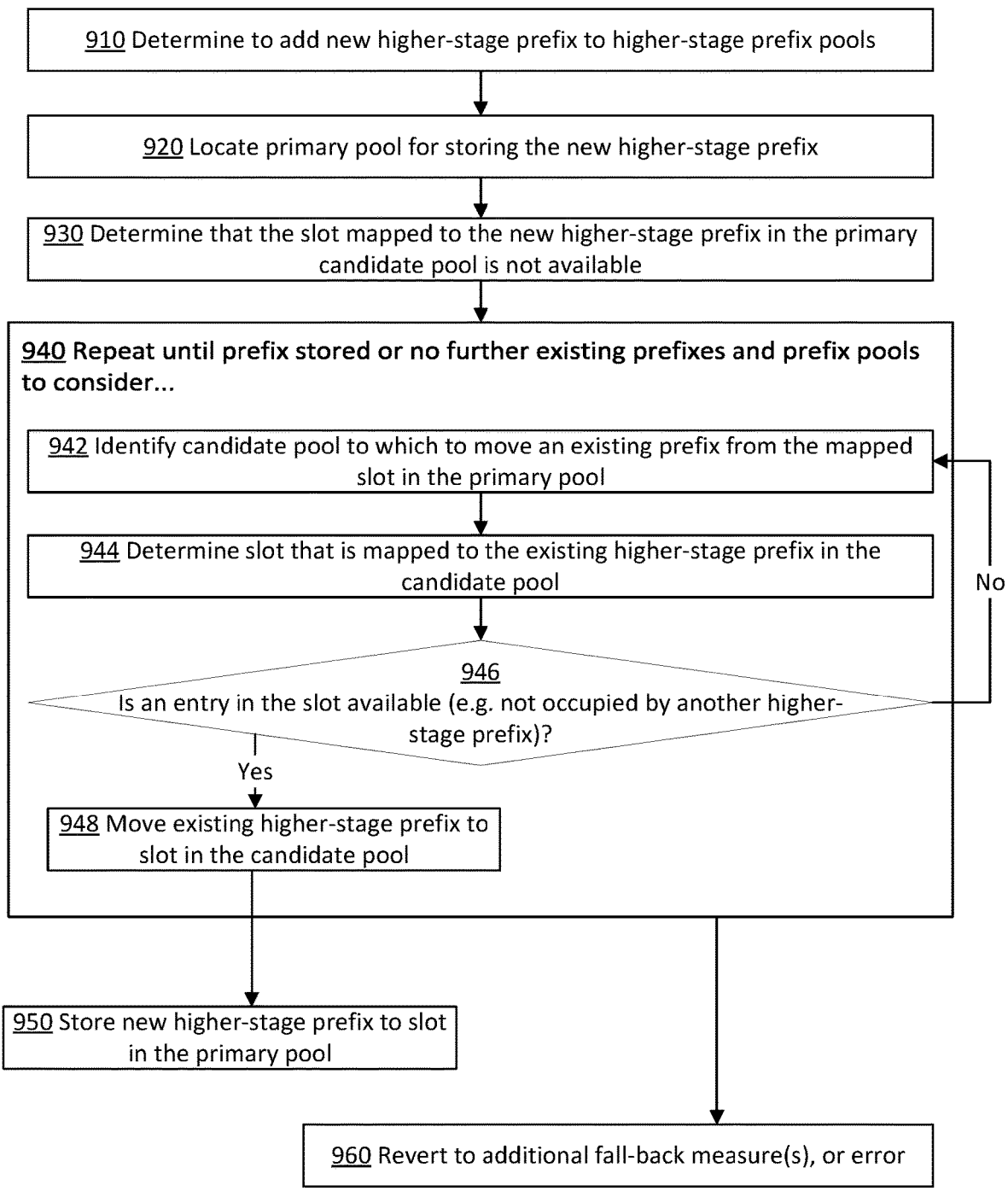
FIG. 9 illustrates an example flow for moving an existing prefix to an alternative higher-stage pool to make a slot available for a new prefix.

FIG. 9 illustrates an example flow 900 for moving an existing prefix to an alternative higher-stage pool to make a slot available for a new prefix, according to an embodiment. Flow 900 illustrates another example of a fallback measure that may be taken pursuant to block 760 (and 860) above.

Block 910 comprises determining to add a new higher-stage prefix to higher-stage prefix pools, as in block 710 above. Block 920 comprises locating a primary pool for storing the new prefix, as in block 720. Block 930 comprises determining that the slot mapped to the new prefix in the primary candidate pool is not available, as may occur in performance of blocks 730 and 740.

Block 940 comprises searching for an alternative higher-stage pool to which to move an existing prefix in mapped slot of the primary pool. The search involves various subblocks that may be repeated for each existing prefix and each possible alternative pool until all of the existing prefixes and candidate pools are exhausted, or until an existing prefix is moved.

Subblock 942 comprises identifying a candidate pool to move an existing prefix to. A candidate pool for the existing prefix may be identified in similar manner to a candidate pool for a new prefix, as described, for example, with respect to block 720. For example, in an embodiment, the candidate pool may be the pool with the next closest minimum prefix length that does not exceed the length of the existing higher-stage prefix, other than any pool(s) that have already been considered. In an embodiment, pools associated with minimum prefix lengths that are greater than that of the existing prefix may be ignored for the purposes of block 940.

Subblock 944 comprises determining the slot that is mapped to the existing higher-stage prefix in the candidate pool. Subblock 944 may be performed in similar manner to block 730. However, in some embodiments, different mapping logic may be used depending on the pool. For instance, whereas the mapping logic for the primary candidate pool might have been based on the first twenty-eight bits of the existing prefix, the mapping logic for the next candidate pool might be based on the first twenty-four bits of the existing prefix. Consequently, the existing prefix may be mapped to a different slot number in the candidate pool than in the pool in which it is already stored.

Subblock 946 comprises determining if the slot identified in block 944 is available to store the existing prefix. If so, then in block 948 the existing prefix is moved to the identified slot in the candidate pool, along with its prefix data. Then, in block 950, the new prefix is stored in the slot mapped to the new prefix in the primary pool. The new higher-stage prefix may be associated with any relevant prefix data for the new higher-stage prefix, as already described.

Note that, on account of differences in the mapping logic, the existing prefix may be mapped to a different slot in the candidate pool than the new prefix would have been mapped. Hence, block 946 may succeed in finding a slot for an existing prefix in a given pool even if block 846 failed to identify a slot in the same pool to store the new prefix.

If the slot identified in block 944 is not available to store the existing prefix, block 940 may return to subblock 942 for consideration of additional pools, if any. Or, flow 900 may proceed to block 960 to either attempt additional fallback measures, or trigger an error condition. Examples of possible fallback measures may include, without limitation, other measures described herein.

Flows 800 and 900 are but two examples of potential fallback measures. Other fallback measures may involve additional or fewer elements in varying arrangements. For example, in an embodiment, flows 800 and 900 may be combined in a single flow, whereby fallback logic incrementally examines each pool one after another to determine both whether the new prefix may be stored therein, and, if not, whether an existing prefix from an already examined pool may be moved therein.

As another example, flow 800 may be performed recursively, such that an existing prefix is moved from a second pool to a first pool to make room in the second pool to move an existing prefix from a third pool to the second pool, thus freeing a slot in the third pool to store the new prefix or another existing prefix.

3.6. Dividing a Shorter Prefix into Multiple Longer Prefixes

Figure 10:
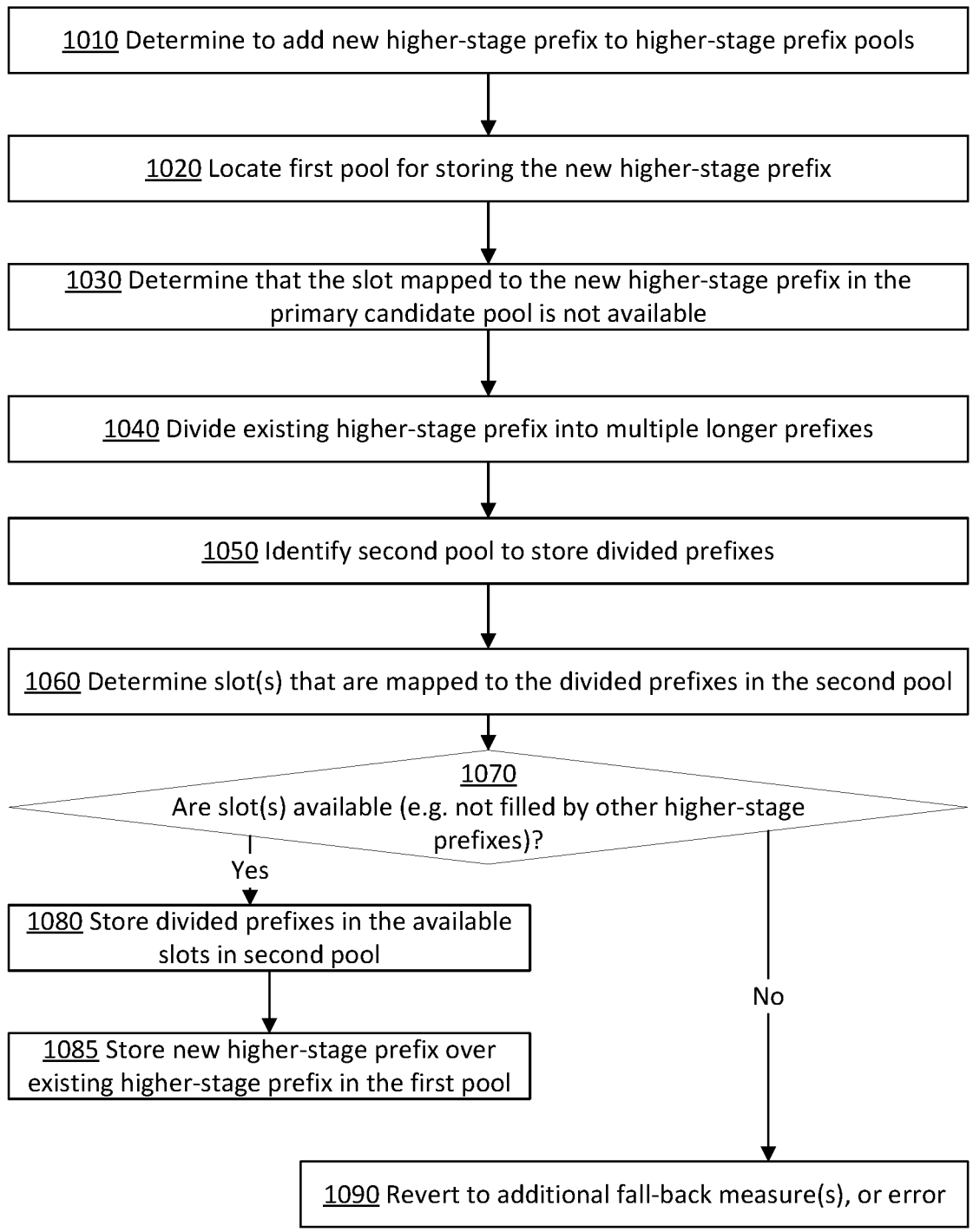
FIG. 10 illustrates an example flow for making a slot available in a higher-stage pool by dividing an existing prefix stored therein into multiple longer prefixes capable of being stored in another higher-stage pool.

FIG. 10 illustrates an example flow 1000 for making a slot available in a higher-stage pool by dividing an existing prefix stored therein into multiple longer prefixes capable of being stored in another higher-stage pool, according to an embodiment. Flow 1000 illustrates another example of a fallback measure that may be taken pursuant to blocks 760, 860, and 960 above.

Block 1010 comprises determining to add a new higher-stage prefix to higher-stage prefix pools, as in block 710 above. Block 1020 comprises locating a first pool for storing the new prefix, as in block 720. Block 1030 comprises determining that the slot mapped to the new prefix in the primary candidate pool is not available, as may occur in performance of blocks 730 and 740.

Block 1040 comprises dividing an existing higher-stage prefix in the mapped slot into multiple, longer prefixes. The existing prefix may be chosen using any suitable logic. For example, an existing prefix with a shortest prefix length may be chosen, or an existing prefix having some other preferable quality may be chosen. In an embodiment, each of the existing prefixes in the mapped slot are evaluated iteratively until an entry becomes available for the new prefix.

For instance, in an embodiment, a sixteen-bit prefix such as 192.168.0.0/16 might be divided into two prefixes of seventeen bits in length (192.168.0.0/17 and 192.168.0.128/17), four prefixes of eighteen bits in length (192.168.0.0/18, 192.168.0.64/18, 192.168.0.128/18, and 192.168.0.192/18), and so forth.

In an embodiment, block 1040 only attempts to divide the existing prefix into prefixes of lengths that correspond to the minimum prefix lengths of the higher-stage pools. This is so as to create the prefixes of sufficient length to allow the divided prefixes to be stored in a higher-stage pool whose minimum prefix length is greater than that of the existing prefix, without creating unnecessary additional prefixes. Hence, for instance, if the existing prefix is twenty-three bits in length, and if the higher-stage pool with the next closest minimum prefix length has an associated prefix length of twenty-four, the existing prefix would be divided into two twenty-four-bit prefixes. If, on the other hand, the higher-stage pool with the next closest minimum prefix length has an associated prefix length of twenty-five, the existing prefix would be divided into four twenty-five-bit prefixes.

Block 1050 comprises identifying a second pool to store the divided prefixes in. For example, the second pool may be a pool having a minimum prefix length that is closest to, but greater than, that of the existing prefix. In an embodiment, as explained above, the second pool may be a pool whose associated prefix length is the same as that of the divided prefixes.

Block 1060 comprises determining which slot or slots in the second pool are mapped to the divided prefixes, in similar manner to block 744. The mapping logic for the pool may or may not be such that each divided prefix maps to a different slot. Again, a hashing function that takes the entire length of the divided prefixes is one example of a suitable mapping mechanism.

Block 1070 comprises determining whether all of the identified slot(s) are available for storing the divided prefixes. If so, then in block 1080 the divided prefixes are stored in their respectively mapped slots in the second pool, along with copies of the prefix data that was stored with the existing prefix. For example, in an embodiment, all of the divided prefixes may be stored with a pointer to the same lower-stage prefix array. Alternatively, block 1080 may comprise dividing the lower-stage prefix array into multiple arrays that correspond to the divided higher-stage prefixes.

Further, in block 1085, the new higher-stage prefix may be stored in its mapped slot in the first pool, replacing the existing prefix. The new higher-stage prefix may be associated with any relevant prefix data for the new higher-stage prefix, as already described.

If not all of the identified slots are available for storing the divided prefixes, then again various fallback measures may be attempted in block 1090, or an error condition may be triggered. Examples of possible fallback measures may include, without limitation, other measures described herein. Moreover, the fallback logic may attempt to move an existing prefix out of one of the slots of the second pool to which one of the divided prefixes was mapped, so as to make room for the divided prefix.

Flow 1000 is but one example technique that involves dividing an existing prefix. Other techniques may include additional or fewer elements in varying arrangements. For example, in an embodiment, if dividing the prefixes into two prefixes fails for one pool, the prefixes may be divided into four prefixes for another pool. As another example, there may be multiple second pools of the same length whose slots may be utilized, and the divided prefixes may be distributed amongst these second pools. Moreover, there may be multiple second pools of different lengths. The existing prefix might be divided into prefixes of different lengths (e.g. the prefix 1101/4 might be divided into 11010/5, 110100/6 and 110101/6) and stored in these multiple second pools.

In an embodiment, based on the data in the lower-stage prefix array to which the existing higher-stage prefix points, it may be determined that one or more of the divided higher-stage prefixes are unnecessary (e.g. do not have any associated policy data or sub-nodes). These divided higher-stage prefixes may be discarded, thus reducing the number of slots in the second pool that must be found to store the divided higher-stage prefixes.

In an embodiment, the division technique may be used to make slots available to move another existing prefix, per flow 900, or to make a slot available in an alternative pool, per flow 800.

3.7. Utilizing an Overflow TCAM

Figure 11:
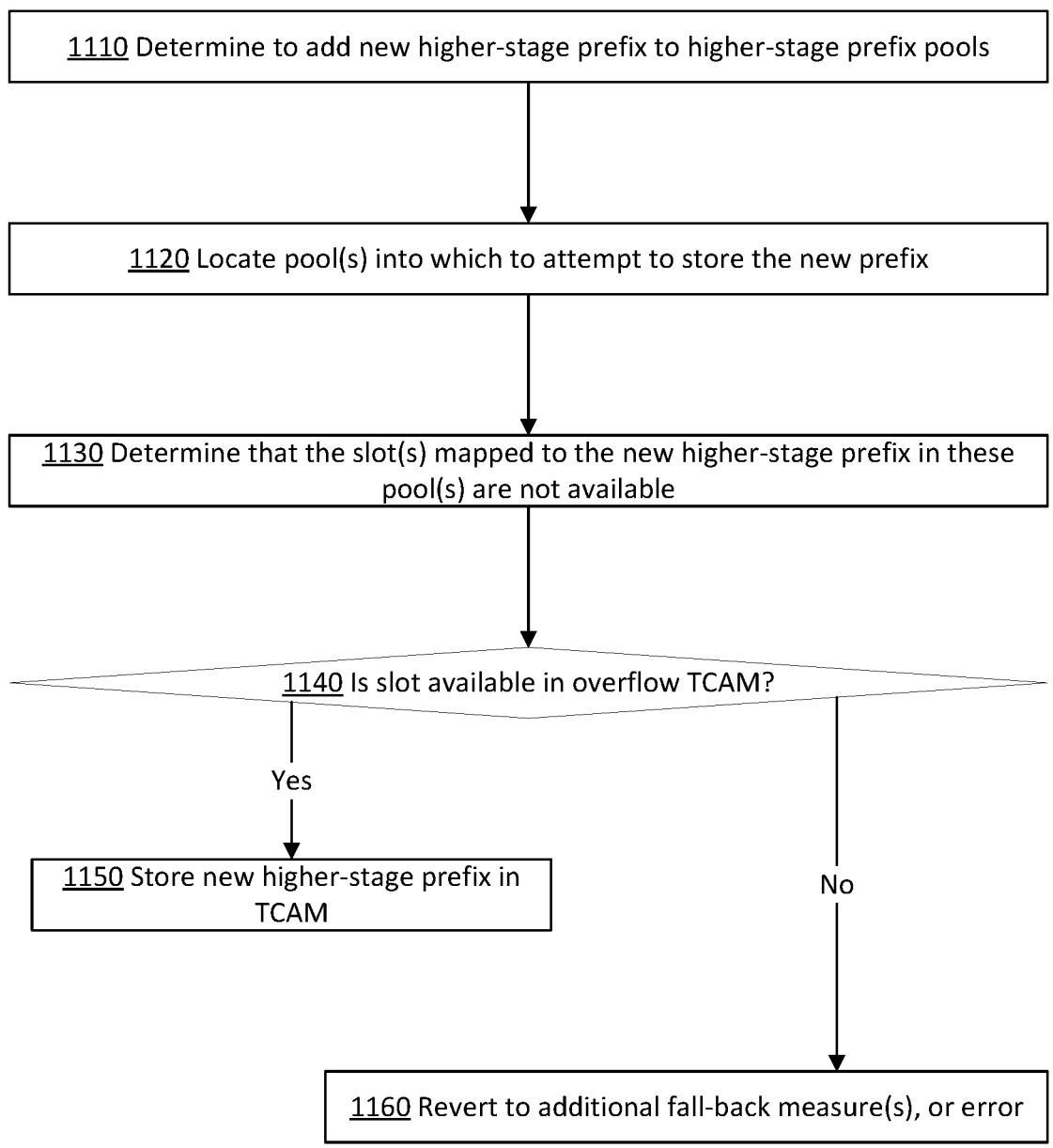
FIG. 11 illustrates an example flow 1100 for storing a new higher-stage prefix in an overflow TCAM instead of a higher-stage prefix pool.

FIG. 11 illustrates an example flow 1100 for storing a new higher-stage prefix in an overflow TCAM instead of a higher-stage prefix pool, according to an embodiment. Flow 1100 illustrates another example of a fallback measure that may be taken pursuant to blocks 760, 860, 960, and 1060.

Block 1110 comprises determining to add a new higher-stage prefix to higher-stage prefix pools, as in block 710 above. Block 1120 comprises locating a pool or pools into which to attempt to store the new prefix. For instance, block 1120 may comprise locating a primary candidate pool, per block 720, as well as, in some embodiments, alternative candidate pools per block 842.

Block 1130 comprises determining that the slot(s) mapped to the new higher-stage prefix in these pool(s) are not available. This may comprise, for instance, determining that each slot mapped to the new prefix is already occupied by an existing higher-stage prefix, in similar manner to blocks 730 and 740. Moreover, this may, in some embodiments, comprise determining that these slots cannot be freed by moving the existing higher-stage prefixes per the techniques described in flows 900 and 1000, or by other techniques.

Block 1140 comprises determining whether there is a slot available to store the new prefix in an overflow TCAM, such as TCAM 378. Unlike in the higher-stage pools, the new prefix may be stored in any empty slot in the overflow TCAM.

If there is a slot available in the overflow TCAM, then in block 1150, the new prefix is stored therein, along with any relevant prefix data. Otherwise, then in block 1160, additional fallback measures (if any) may be employed, or an error condition triggered.

In an embodiment, flow 1100 is a measure of last resort for storing a new prefix, once other fallback measures have failed. However, in other embodiments, storing a new prefix in an overflow TCAM may be a higher-priority fallback measure than certain other measures already described for at least some prefixes.

4.0. Example Embodiments

Examples of some embodiments are represented, without limitation, in the following clauses:

According to an embodiment, an apparatus comprises: one or more first memories configured to store pools of higher-stage prefixes; one or more second memories configured to store arrays of lower-stage prefixes; prefix matching logic configured to find a longest prefix match for an input key by: selecting a longest matching higher-stage prefix for the input key from the pools of higher-stage prefixes by: identifying, in each of at least two of the pools, one or more particular higher-stage prefixes stored in a slot mapped to the input key; and selecting the longest matching higher-stage prefix from a group comprising each of the identified one or more particular higher-stage prefixes stored in a slot mapped to the input key; following a pointer associated with the longest-matching higher-stage prefix to a particular array of the arrays; and selecting a longest-matching lower-stage prefix for the input key from the particular array as the longest prefix match.

In an embodiment, the apparatus is a networking apparatus, the apparatus further comprising forwarding logic configured to: determine the input key based on a first data unit; forward the first data unit in accordance with a forwarding policy stored in association with the longest prefix match for the input key.

In an embodiment, the input key is an Internet Protocol address and wherein the higher-stage prefixes and lower-stage prefixes are groups of Internet Protocol addresses that share same numbers of leading bits.

In an embodiment, a given prefix in a group of prefixes is the longest matching prefix for the input key in the group of prefixes when the input key begins with the given prefix and the given prefix is longer than any other prefix in the group that the input key begins with.

In an embodiment, the prefix matching logic is configured to concurrently read, from the different pools, each of the identified one or more particular higher-stage prefixes stored in a slot mapped to the input key, each of the pools being a separate memory bank.

In an embodiment, the one or more first memories and one or more second memories are random access memories.

In an embodiment, the pools are stored in separate sets of addresses within a same memory.

In an embodiment, the one or more first memories are not content-addressable memories.

In an embodiment, the one or more first memories and the one or more second memories are a same set of one or more memories.

In an embodiment, the apparatus further comprises a content-addressable memory configured to store additional higher-stage prefixes, wherein the prefix matching logic is further configured to select a longest-matching prefix from the content-addressable memory to include in the group from which the longest-matching higher-stage prefix is selected.

In an embodiment, the apparatus further comprises prefix table management logic configured to, responsive to determining that none of the pools is available to store a new higher-stage prefix, store the new higher-stage prefix in the content-addressable memory.

In an embodiment, the content-addressable memory is a ternary content-addressable memory.

In an embodiment, identifying, in each pool, the particular higher-stage prefix stored in the slot mapped to the input key comprises executing one or more hash functions on the input key to determine, for each pool, the address of the slot mapped to the input key.

In an embodiment, for each pool of two or more of the pools, the prefix matching logic is configured to use different hashing logics to determine the slot mapped to the input key in the pool.

In an embodiment, the different hashing logics vary in one or both of the hashing algorithm used or the number of bits from the input key that are inputted into the hashing algorithm.

In an embodiment, identifying, in a given pool, the particular higher-stage prefix stored in the slot mapped to the input key comprises executing a hash function on a first number of bits of the input key to determine, for the given pool, the address of the slot mapped to the input key, the number of bits corresponding to a designated prefix length for all prefixes stored in the given pool.

In an embodiment, each particular pool of the pools has an associated minimum prefix length that the higher-stage prefixes in the particular pool cannot exceed, wherein a first pool of the pools is associated with a different minimum prefix length than a second pool of the pools.

In an embodiment, the minimum prefix length of a given pool is a configurable boot-time parameter.

In an embodiment, the input key is a first input key, wherein the prefix matching logic is configured to select the longest-matching higher-stage prefix for a second input key as the longest prefix match for the second input key, responsive to determining that prefix data stored in association with the longest-matching higher-stage prefix for the second input key is not associated with a pointer.

In an embodiment, one or more of the higher-stage prefixes, including the longest-matching higher-stage prefix for the second input key, are stored in association with policy data instead of pointers.

In an embodiment, the apparatus further comprises prefix table management logic configured to maintain a prefix table in the one or more first memories and one or more second memories based on: arranging the prefix table into sub-graphs, storing higher-level nodes of the sub-graphs in the pools, and storing lower-level nodes of the sub-graphs in the arrays.

In an embodiment, each particular pool of the pools has an associated minimum prefix length, the apparatus further comprising prefix table management logic configured to add a new higher-stage prefix of a given prefix length to a first pool responsive to determining that no other pool of the pools with an eligible slot to store the new higher-stage prefix has a minimum prefix length that is closer to, but not greater than, the given prefix length.

In an embodiment, a pool has an eligible slot to store the new-higher stage prefix if a mapping function maps the new higher-stage prefix to a slot that comprises an entry that is not already occupied by another higher-stage prefix.

In an embodiment, the prefix table management logic is further configured to, prior to adding the new higher-stage prefix to the first pool in the eligible slot, move an existing higher-stage prefix from the eligible slot in the first pool to another slot in a second pool.

In an embodiment, each particular pool of the pools has an associated minimum prefix length, the apparatus further comprising prefix table management logic configured to, responsive to determining that there is no pool available to store a given prefix of a first prefix length, divide the given prefix into multiple prefixes of a second prefix length that fits in a particular pool whose minimum prefix length is greater than the first prefix length.

According to an embodiment, a method comprises: storing pools of higher-stage prefixes in one or more first memories; storing arrays of lower-stage prefixes in one or more second memories; finding a longest prefix match for an input key by: selecting a longest matching higher-stage prefix for the input key from the pools of higher-stage prefixes by: identifying, in each of at least two of the pools, one or more particular higher-stage prefixes stored in a slot mapped to the input key; and selecting the longest matching higher-stage prefix from a group comprising each of the identified one or more particular higher-stage prefixes stored in a slot mapped to the input key; following a pointer associated with the longest-matching higher-stage prefix to a particular array of the arrays; and selecting a longest-matching lower-stage prefix for the input key from the particular array as the longest prefix match.

In an embodiment, the method further comprises: determining the input key based on a first data unit received at a network device; forwarding the first data unit from the network device in accordance with a forwarding policy stored in association with the longest prefix match for the input key.

In an embodiment, the method further comprises: concurrently reading, from the different pools, each of the identified one or more particular higher-stage prefixes stored in a slot mapped to the input key, each of the pools being a separate memory bank.

In an embodiment, the method further comprises: selecting, from a content-addressable memory configured to store additional higher-stage prefixes, another longest matching prefix to include in the group from which the longest matching higher stage prefix is selected.

In an embodiment, the method further comprises: for each pool of two or more of the pools, using different hashing logic to determine the slot mapped to the input key in the pool.

In an embodiment, the method further comprises: maintaining a prefix table in the one or more first memories and one or more second memories based on: arranging the prefix table into a graph, storing higher-level nodes of the graph in the pools, and storing lower-level nodes of the graph in the arrays.

In an embodiment, each particular pool of the pools has an associated minimum prefix length, the method further comprising adding a new higher-stage prefix of a given prefix length to a first pool responsive to determining that no other pool of the pools with an eligible slot to store the new higher-stage prefix has a minimum prefix length that is closer to, but not greater than, the given prefix length.

In an embodiment, the prefix table management logic is further configured to, prior to adding the new higher-stage prefix to the first pool in the eligible slot, move an existing higher-stage prefix from the eligible slot in the first pool to another slot in a second pool.

In an embodiment, each particular pool of the pools has an associated minimum prefix length, the method further comprising, responsive to determining that there is no pool available to store a given prefix of a first prefix length, dividing the given prefix into multiple prefixes of a second prefix length that fits in a particular pool whose minimum prefix length is greater than the first prefix length.

5.0. Implementation Mechanism—Hardware Overview

According to one embodiment, the techniques described herein are implemented by one or more special-purpose computing devices. The special-purpose computing devices may be desktop computer systems, portable computer systems, handheld devices, networking devices, or any other device that incorporates hard-wired and/or program logic to implement the techniques. The special-purpose computing devices may be hard-wired to perform the techniques, or may include digital electronic devices such as one or more application-specific integrated circuits (ASICs) or field programmable gate arrays (FPGAs) that are persistently programmed to perform the techniques. Such special-purpose computing devices may also combine custom hard-wired logic, ASICs, FPGAs, or other circuitry with custom programming to accomplish the techniques.

Though certain foregoing techniques are described with respect to a hardware implementation, which provides a number of advantages in certain embodiments, it will also be recognized that, in other embodiments, the foregoing techniques may still provide certain advantages when performed partially or wholly in software. Accordingly, in such an embodiment, a suitable implementing apparatus comprises a general-purpose hardware processor and is configured to perform any of the foregoing methods by executing program instructions in firmware, memory, other storage, or a combination thereof.

Figure 12:
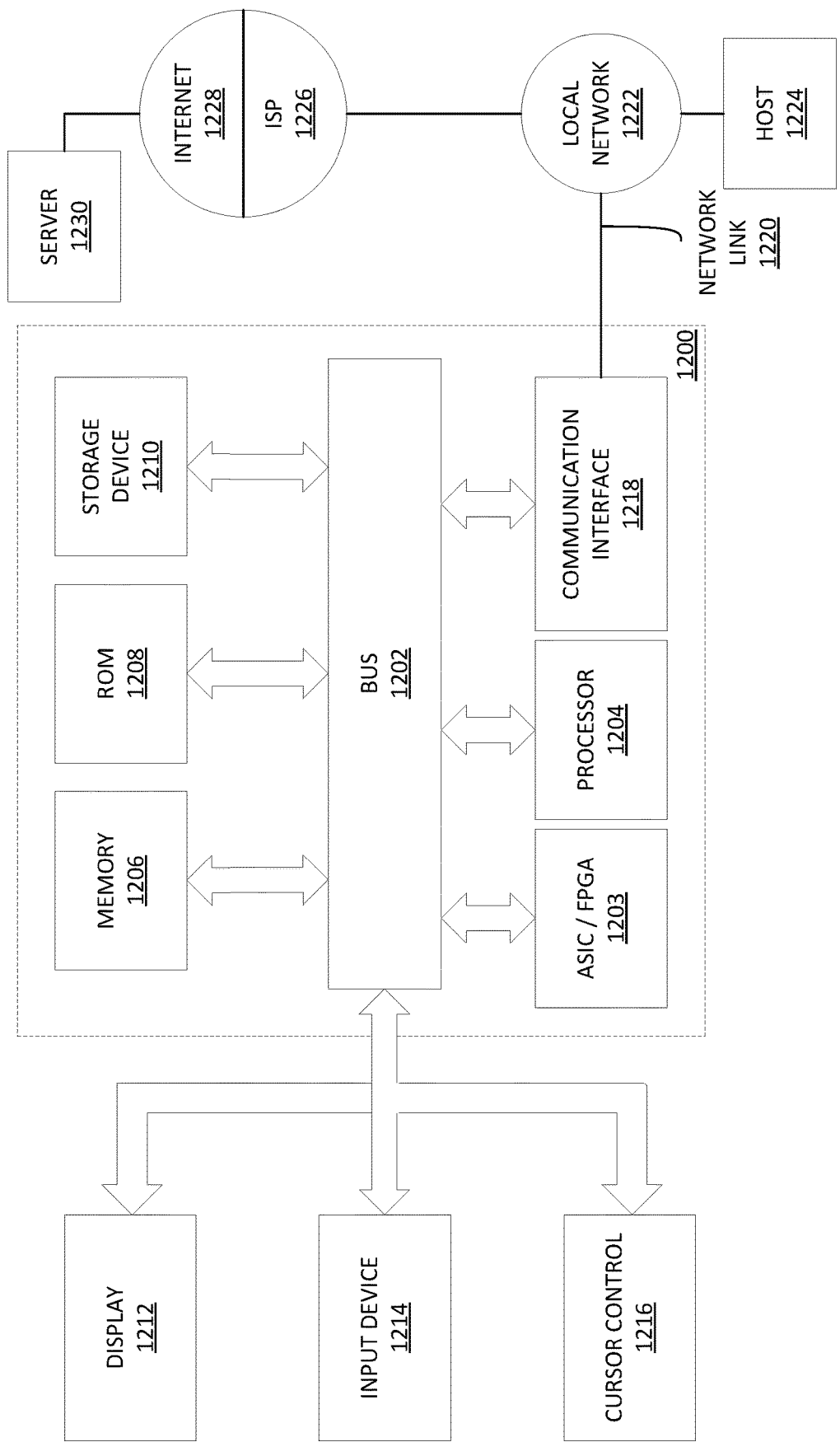
FIG. 12 is block diagram of a computer system upon which embodiments of the inventive subject matter may be implemented.

FIG. 12 is a block diagram that illustrates a computer system 1200 that may be utilized in implementing the above-described techniques, according to an embodiment. Computer system 1200 may be, for example, a desktop computing device, laptop computing device, tablet, smartphone, server appliance, computing mainframe, multimedia device, handheld device, networking apparatus, or any other suitable device. In an embodiment, FIG. 12 is a different view of the devices and systems described in previous sections.

Computer system 1200 may include one or more ASICs, FPGAs, or other specialized circuitry 1203 for implementing program logic as described herein. For example, circuitry 1203 may include fixed and/or configurable hardware logic blocks for implementing some or all of the described techniques, input/output (I/O) blocks, hardware registers or other embedded memory resources such as random-access memory (RAM) for storing various data, and so forth. The logic blocks may include, for example, arrangements of logic gates, flip-flops, multiplexers, and so forth, configured to generate an output signals based on logic operations performed on input signals.

Additionally, and/or instead, computer system 1200 may include one or more hardware processors 1204 configured to execute software-based instructions. Computer system 1200 may also include one or more busses 1202 or other communication mechanism for communicating information. Busses 1202 may include various internal and/or external components, including, without limitation, internal processor or memory busses, a Serial ATA bus, a PCI Express bus, a Universal Serial Bus, a HyperTransport bus, an Infiniband bus, and/or any other suitable wired or wireless communication channel.

Computer system 1200 also includes one or more memories 1206, such as a RAM, hardware registers, or other dynamic or volatile storage device for storing data units to be processed by the one or more ASICs, FPGAs, or other specialized circuitry 1203. Memory 1206 may also or instead be used for storing information and instructions to be executed by processor 1204. Memory 1206 may be directly connected or embedded within circuitry 1203 or a processor 1204. Or, memory 1206 may be coupled to and accessed via bus 1202. Memory 1206 also may be used for storing temporary variables, data units describing rules or policies, or other intermediate information during execution of program logic or instructions.

Computer system 1200 further includes one or more read only memories (ROM) 1208 or other static storage devices coupled to bus 1202 for storing static information and instructions for processor 1204. One or more storage devices 1210, such as a solid-state drive (SSD), magnetic disk, optical disk, or other suitable non-volatile storage device, may optionally be provided and coupled to bus 1202 for storing information and instructions.

A computer system 1200 may also include, in an embodiment, one or more communication interfaces 1218 coupled to bus 1202. A communication interface 1218 provides a data communication coupling, typically two-way, to a network link 1220 that is connected to a local network 1222. For example, a communication interface 1218 may be an integrated services digital network (ISDN) card, cable modem, satellite modem, or a modem to provide a data communication connection to a corresponding type of telephone line. As another example, the one or more communication interfaces 1218 may include a local area network (LAN) card to provide a data communication connection to a compatible LAN. As yet another example, the one or more communication interfaces 1218 may include a wireless network interface controller, such as a 1202.11-based controller, Bluetooth controller, Long Term Evolution (LTE) modem, and/or other types of wireless interfaces. In any such implementation, communication interface 1218 sends and receives electrical, electromagnetic, or optical signals that carry digital data streams representing various types of information.

Network link 1220 typically provides data communication through one or more networks to other data devices. For example, network link 1220 may provide a connection through local network 1222 to a host computer 1224 or to data equipment operated by a Service Provider 1226. Service Provider 1226, which may for example be an Internet Service Provider (ISP), in turn provides data communication services through a wide area network, such as the world-wide packet data communication network now commonly referred to as the "Internet" 1228. Local network 1222 and Internet 1228 both use electrical, electromagnetic or optical signals that carry digital data streams. The signals through the various networks and the signals on network link 1220 and through communication interface 1218, which carry the digital data to and from computer system 1200, are example forms of transmission media.

In an embodiment, computer system 1200 can send packets and receive data through the network(s), network link 1220, and communication interface 1218. In some embodiments, this data may be data units that the computer system 1200 has been asked to process and, if necessary, redirect to other computer systems via a suitable network link 1220. In other embodiments, this data may be instructions for implementing various processes related to the described techniques. For instance, in the Internet example, a server 1230 might transmit a requested code for an application program through Internet 1228, ISP 1226, local network 1222 and communication interface 1218. The received code may be executed by processor 1204 as it is received, and/or stored in storage device 1210, or other non-volatile storage for later execution. As another example, information received via a network link 1220 may be interpreted and/or processed by a software component of the computer system 1200, such as a web browser, application, or server, which in turn issues instructions based thereon to a processor 1204, possibly via an operating system and/or other intermediate layers of software components.

Computer system 1200 may optionally be coupled via bus 1202 to one or more displays 1212 for presenting information to a computer user. For instance, computer system 1200 may be connected via a High-Definition Multimedia Interface (HDMI) cable or other suitable cabling to a Liquid Crystal Display (LCD) monitor, and/or via a wireless connection such as peer-to-peer Wi-Fi Direct connection to a Light-Emitting Diode (LED) television. Other examples of suitable types of displays 1212 may include, without limitation, plasma display devices, projectors, cathode ray tube (CRT) monitors, electronic paper, virtual reality headsets, braille terminal, and/or any other suitable device for outputting information to a computer user. In an embodiment, any suitable type of output device, such as, for instance, an audio speaker or printer, may be utilized instead of a display 1212.

One or more input devices 1214 are optionally coupled to bus 1202 for communicating information and command selections to processor 1204. One example of an input device 1214 is a keyboard, including alphanumeric and other keys. Another type of user input device 1214 is cursor control 1216, such as a mouse, a trackball, or cursor direction keys for communicating direction information and command selections to processor 1204 and for controlling cursor movement on display 1212. This input device typically has two degrees of freedom in two axes, a first axis (e.g., x) and a second axis (e.g., y), that allows the device to specify positions in a plane. Yet other examples of suitable input devices 1214 include a touch-screen panel affixed to a display 1212, cameras, microphones, accelerometers, motion detectors, and/or other sensors. In an embodiment, a network-based input device 1214 may be utilized. In such an embodiment, user input and/or other information or commands may be relayed via routers and/or switches on a Local Area Network (LAN) or other suitable shared network, or via a peer-to-peer network, from the input device 1214 to a network link 1220 on the computer system 1200.

As discussed, computer system 1200 may implement techniques described herein using customized hard-wired logic, one or more ASICs or FPGAs 1203, firmware and/or program logic, which in combination with the computer system causes or programs computer system 1200 to be a special-purpose machine. According to one embodiment, however, the techniques herein are performed by computer system 1200 in response to processor 1204 executing one or more sequences of one or more instructions contained in main memory 1206. Such instructions may be read into main memory 1206 from another storage medium, such as storage device 1210. Execution of the sequences of instructions contained in main memory 1206 causes processor 1204 to perform the process steps described herein.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 1210. Volatile media includes dynamic memory, such as main memory 1206. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1202. Transmission media can also take the form of acoustic or light waves, such as those generated during radio-wave and infra-red data communications.

Various forms of media may be involved in carrying one or more sequences of one or more instructions to processor 1204 for execution. For example, the instructions may initially be carried on a magnetic disk or solid-state drive of a remote computer. The remote computer can load the instructions into its dynamic memory and use a modem to send the instructions over a network, such as a cable network or cellular network, as modulated signals. A modem local to computer system 1200 can receive the data on the network and demodulate the signal to decode the transmitted instructions. Appropriate circuitry can then place the data on bus 1202. Bus 1202 carries the data to main memory 1206, from which processor 1204 retrieves and executes the instructions. The instructions received by main memory 1206 may optionally be stored on storage device 1210 either before or after execution by processor 1204.

6.0. Extensions and Alternatives

As used herein, the terms "first," "second," "certain," and "particular" are used as naming conventions to distinguish queries, plans, representations, steps, objects, devices, or other items from each other, so that these items may be referenced after they have been introduced. Unless otherwise specified herein, the use of these terms does not imply an ordering, timing, or any other characteristic of the referenced items.

In the drawings, the various components are depicted as being communicatively coupled to various other components by arrows. These arrows illustrate only certain examples of information flows between the components. Neither the direction of the arrows nor the lack of arrow lines between certain components should be interpreted as indicating the existence or absence of communication between the certain components themselves. Indeed, each component may feature a suitable communication interface by which the component may become communicatively coupled to other components as needed to accomplish any of the functions described herein.

In the foregoing specification, embodiments of the inventive subject matter have been described with reference to numerous specific details that may vary from implementation to implementation. Thus, the sole and exclusive indicator of what is the inventive subject matter, and is intended by the applicants to be the inventive subject matter, is the set of claims that issue from this application, in the specific form in which such claims issue, including any subsequent correction. In this regard, although specific claim dependencies are set out in the claims of this application, it is to be noted that the features of the dependent claims of this application may be combined as appropriate with the features of other dependent claims and with the features of the independent claims of this application, and not merely according to the specific dependencies recited in the set of claims. Moreover, although separate embodiments are discussed herein, any combination of embodiments and/or partial embodiments discussed herein may be combined to form further embodiments.

Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. An apparatus comprising:
   one or more first memories configured to store pools of higher-stage prefixes;
   one or more second memories configured to store arrays of lower-stage prefixes;

prefix matching logic, implemented at least partially by computing hardware, configured to find a longest prefix match for an input key by:
  selecting a longest matching higher-stage prefix for the input key from the pools of higher-stage prefixes by:
    identifying, in each of at least two of the pools, one or more particular higher-stage prefixes stored in a slot mapped to the input key; and
    selecting the longest matching higher-stage prefix from a group comprising each of the identified one or more particular higher-stage prefixes stored in a slot mapped to the input key;
  determining a particular array of the arrays of lower-stage prefixes in which to search for the longest prefix match by following a pointer associated with the longest-matching higher-stage prefix to the particular array; and
  selecting a longest-matching lower-stage prefix for the input key from the particular array as the longest prefix match.

2. The apparatus of claim 1, wherein the apparatus is a networking apparatus, the apparatus further comprising forwarding logic configured to:
  determine the input key based on a first data unit;
  forward the first data unit in accordance with a forwarding policy stored in association with the longest prefix match for the input key.

3. The apparatus of claim 1, wherein the prefix matching logic is configured to concurrently read, from the different pools, each of the identified one or more particular higher-stage prefixes stored in a slot mapped to the input key, each of the pools being a separate memory bank.

4. The apparatus of claim 1, further comprising a content-addressable memory configured to store additional higher-stage prefixes, wherein the prefix matching logic is further configured to select a longest-matching prefix from the content-addressable memory to include in the group from which the longest-matching higher-stage prefix is selected.

5. The apparatus of claim 1, wherein, for each pool of two or more of the pools, the prefix matching logic is configured to use different hashing logics to determine the slot mapped to the input key in the pool.

6. The apparatus of claim 1, wherein each particular pool of the pools has an associated minimum prefix length that the higher-stage prefixes in the particular pool cannot exceed, wherein a first pool of the pools is associated with a different minimum prefix length than a second pool of the pools.

7. The apparatus of claim 1, further comprising prefix table management logic configured to maintain a prefix table in the one or more first memories and one or more second memories based on: arranging the prefix table into sub-graphs, storing higher-level nodes of the sub-graphs in the pools, and storing lower-level nodes of the sub-graphs in the arrays.

8. The apparatus of claim 1, wherein each particular pool of the pools has an associated minimum prefix length, the apparatus further comprising prefix table management logic configured to add a new higher-stage prefix of a given prefix length to a first pool responsive to determining that no other pool of the pools with an eligible slot to store the new higher-stage prefix has a minimum prefix length that is closer to, but not greater than, the given prefix length.

9. The apparatus of claim 8, wherein the prefix table management logic is further configured to, prior to adding the new higher-stage prefix to the first pool in the eligible slot, move an existing higher-stage prefix from the eligible slot in the first pool to another slot in a second pool.

10. The apparatus of claim 1, wherein each particular pool of the pools has an associated minimum prefix length, the apparatus further comprising prefix table management logic configured to, responsive to determining that there is no pool available to store a given prefix of a first prefix length, divide the given prefix into multiple prefixes of a second prefix length that fits in a particular pool whose minimum prefix length is greater than the first prefix length.

11. A method comprising:
  storing pools of higher-stage prefixes in one or more first memories;
  storing arrays of lower-stage prefixes in one or more second memories;
  finding a longest prefix match for an input key by:
    selecting a longest matching higher-stage prefix for the input key from the pools of higher-stage prefixes by:
      identifying, in each of at least two of the pools, one or more particular higher-stage prefixes stored in a slot mapped to the input key; and
      selecting the longest matching higher-stage prefix from a group comprising each of the identified one or more particular higher-stage prefixes stored in a slot mapped to the input key;
    determining a particular array of the arrays of lower-stage prefixes in which to search for the longest prefix match by following a pointer associated with the longest-matching higher-stage prefix to the particular array; and
    selecting a longest-matching lower-stage prefix for the input key from the particular array as the longest prefix match.

12. The method of claim 11, further comprising:
  determining the input key based on a first data unit received at a network device;
  forwarding the first data unit from the network device in accordance with a forwarding policy stored in association with the longest prefix match for the input key.

13. The method of claim 11, further comprising concurrently reading, from the different pools, each of the identified one or more particular higher-stage prefixes stored in a slot mapped to the input key, each of the pools being a separate memory bank.

14. The method of claim 11, further comprising selecting, from a content-addressable memory configured to store additional higher-stage prefixes, another longest matching prefix to include in the group from which the longest matching higher stage prefix is selected.

15. The method of claim 11, further comprising, for each pool of two or more of the pools, using different hashing logic to determine the slot mapped to the input key in the pool.

16. The method of claim 11, further comprising maintaining a prefix table in the one or more first memories and one or more second memories based on: arranging the prefix table into a graph, storing higher-level nodes of the graph in the pools, and storing lower-level nodes of the graph in the arrays.

17. The method of claim 11, wherein each particular pool of the pools has an associated minimum prefix length, the method further comprising adding a new higher-stage prefix of a given prefix length to a first pool responsive to determining that no other pool of the pools with an eligible slot to store the new higher-stage prefix has a minimum prefix length that is closer to, but not greater than, the given prefix length.

18. The method of claim 17, wherein the prefix table management logic is further configured to, prior to adding the new higher-stage prefix to the first pool in the eligible slot, move an existing higher-stage prefix from the eligible slot in the first pool to another slot in a second pool.

19. The method of claim 11, wherein each particular pool of the pools has an associated minimum prefix length, the method further comprising, responsive to determining that there is no pool available to store a given prefix of a first prefix length, dividing the given prefix into multiple prefixes of a second prefix length that fits in a particular pool whose minimum prefix length is greater than the first prefix length.

20. One or more non-transitory computer-readable media storing instructions that, when executed by one or more computing devices, cause performance of:
- storing pools of higher-stage prefixes in one or more first memories;
- storing arrays of lower-stage prefixes in one or more second memories;
- finding a longest prefix match for an input key by:
  - selecting a longest matching higher-stage prefix for the input key from the pools of higher-stage prefixes by:
    - identifying, in each of at least two of the pools, one or more particular higher-stage prefixes stored in a slot mapped to the input key; and
    - selecting the longest matching higher-stage prefix from a group comprising each of the identified one or more particular higher-stage prefixes stored in a slot mapped to the input key;
  - determining a particular array of the arrays of lower-stage prefixes in which to search for the longest prefix match by following a pointer associated with the longest-matching higher-stage prefix to the particular array; and
  - selecting a longest-matching lower-stage prefix for the input key from the particular array as the longest prefix match.

* * * * *